(12) United States Patent
Kim et al.

(10) Patent No.: US 9,374,447 B2
(45) Date of Patent: Jun. 21, 2016

(54) MOBILE TERMINAL AND CONTROL METHOD THEREOF

(71) Applicant: LG ELECTRONICS INC., Seoul (KR)

(72) Inventors: Sangwon Kim, Seoul (KR); Yunsun Choi, Seoul (KR); Mi Jin Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 281 days.

(21) Appl. No.: 13/917,024

(22) Filed: Jun. 13, 2013

(65) Prior Publication Data

US 2014/0221049 A1 Aug. 7, 2014

Related U.S. Application Data

(60) Provisional application No. 61/767,033, filed on Feb. 20, 2013.

(30) Foreign Application Priority Data

Feb. 1, 2013 (KR) .......................... 10-2013-0011976

(51) Int. Cl.
*H04M 1/56* (2006.01)
*H04M 1/725* (2006.01)

(52) U.S. Cl.
CPC ............ *H04M 1/56* (2013.01); *H04M 1/72522* (2013.01); *H04M 1/72552* (2013.01); *H04M 2250/22* (2013.01)

(58) Field of Classification Search
CPC .............. G09G 2354/00; G06F 3/0481; G06F 3/04895; G06F 3/0488; G06F 3/04886; G06F 3/0231; G06F 3/0416; G06F 3/048; G06F 3/0482; G06F 3/04892; G06F 3/011; G06F 3/017; G06F 3/041; G06F 3/044; H04N 1/00381

See application file for complete search history.

(56) References Cited

U.S. PATENT DOCUMENTS

| | | | |
|---|---|---|---|
| 2013/0149989 A1* | 6/2013 | Kwon | H04W 4/08 455/404.2 |
| 2013/0321340 A1* | 12/2013 | Seo | G06F 1/1641 345/174 |
| 2015/0119007 A1* | 4/2015 | Kwon | H04W 4/08 455/414.1 |

FOREIGN PATENT DOCUMENTS

| | | |
|---|---|---|
| EP | 1202574 A2 | 5/2002 |
| EP | 1542468 A1 | 6/2005 |

\* cited by examiner

*Primary Examiner* — Bobbak Safaipour
(74) *Attorney, Agent, or Firm* — Birch, Stewart, Kolasch & Birch, LLP

(57) ABSTRACT

The present disclosure relates to a mobile terminal, and more particularly, to a mobile terminal capable of making a voice call and a control method thereof. A mobile terminal according to an embodiment of the present disclosure may include a display unit formed to enable a touch input and display a screen associated with a call to the counterpart when requesting a call to the counterpart, and a controller configured to switch at least a partial region of the screen to a region for receiving information when an information transmission mode is executed on the screen, and transmit information received by a touch input applied to the switched region to the counterpart.

19 Claims, 20 Drawing Sheets

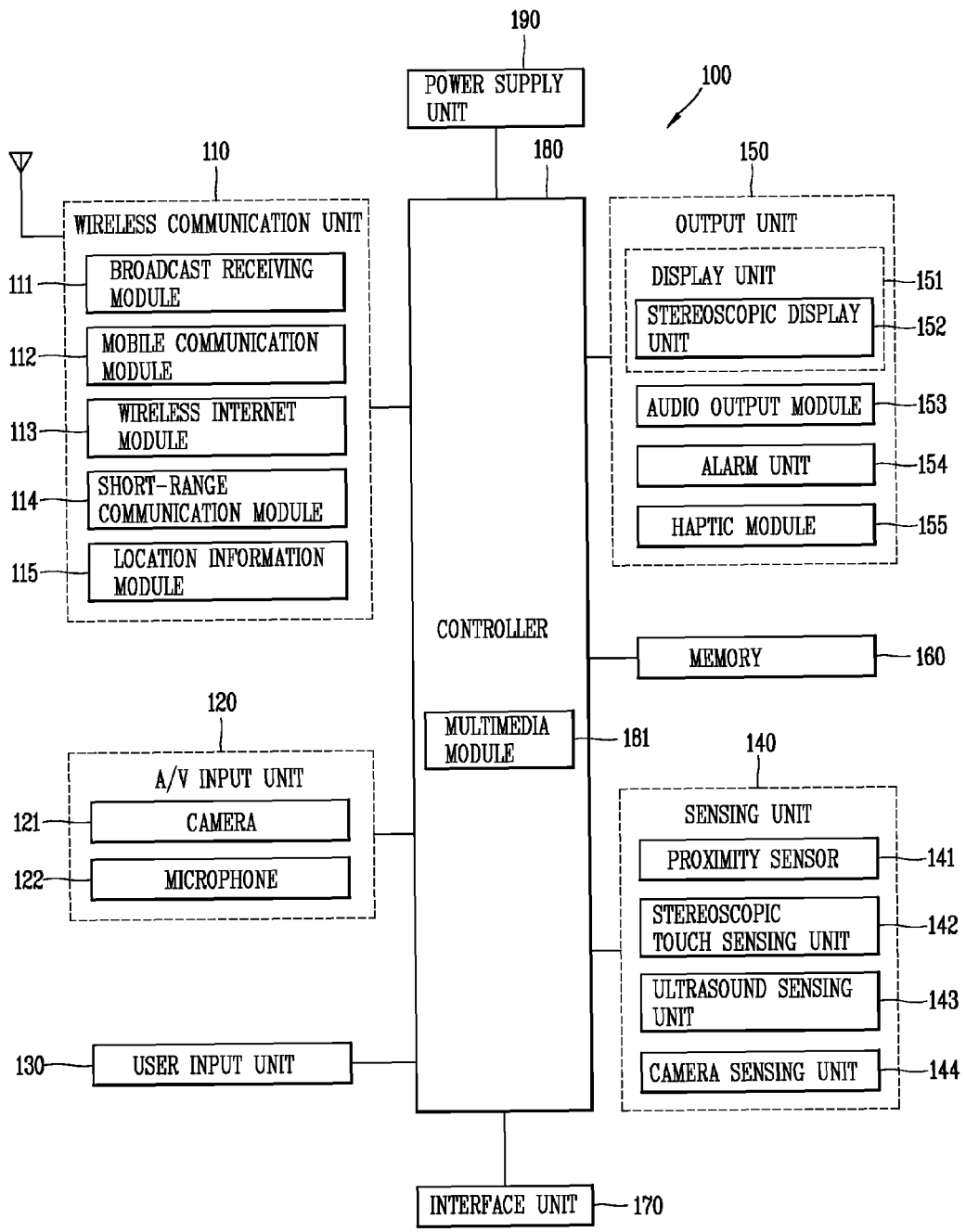

S210 — RECEIVE INFORMATION FROM THE COUNTERPART WHILE RECEIVING CALL FROM THE COUNTERPART

S220 — DISPLAY CALL LOG LIST CONTAINING PLURALITY OF CALL LOG ITEMS ON THE DISPLAY UNIT

S230 — DISPLAY AT LEAST PART OF INFORMATION THAT HAS BEEN RECEIVED FROM THE COUNTERPART UPON RECEIVING CALL FROM THE COUNTERPART ALONG WITH THE CALL LOG ITEM

FIG. 18
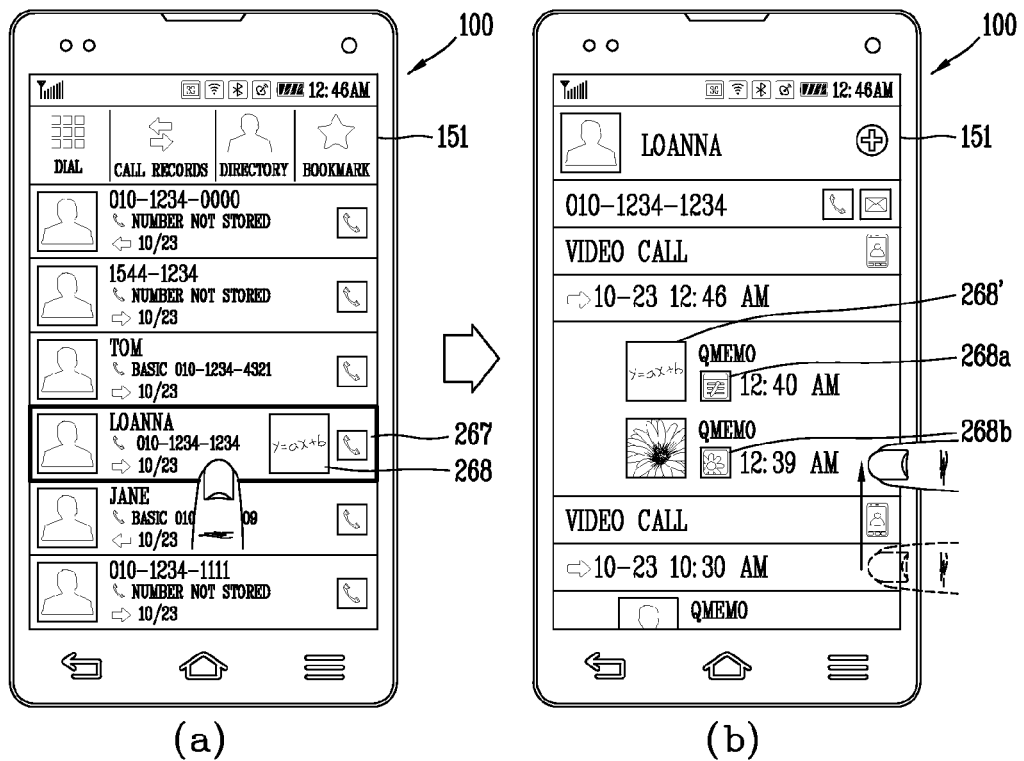
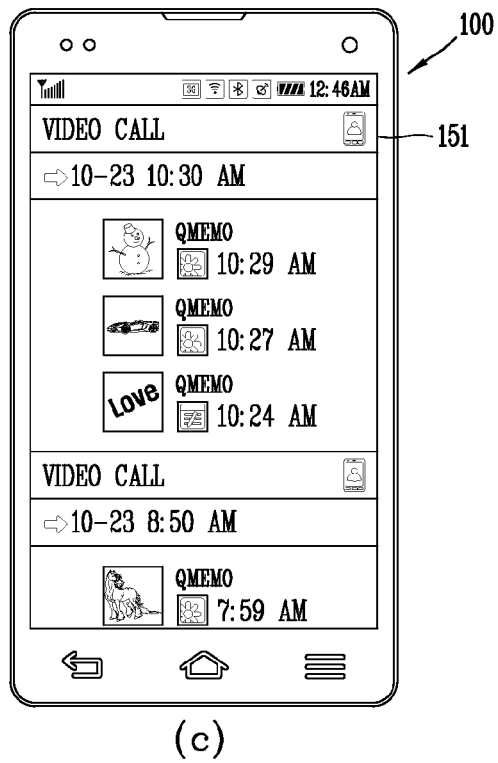

MOBILE TERMINAL AND CONTROL METHOD THEREOF

RELATED APPLICATION

Pursuant to 35 U.S.C. §119(e), this application claims the benefit of U.S. Provisional Application No. 61/767,033, filed on Feb. 20, 2013 and also claims the benefit under 35 U.S.C. §119(a) of earlier filing date and right of priority to Korean Application No. 10-2013-0011976, filed on Feb. 1, 2013. The contents of the above applications are hereby expressly incorporated by reference herein in their entirety.

BACKGROUND OF THE INVENTION

1. Field of the Invention

The present disclosure relates to a mobile terminal, and more particularly, to a mobile terminal capable of making a voice call and a control method thereof.

2. Description of the Related Art

Terminals can be classified into two types, such as a mobile or portable terminal and a stationary terminal based on its mobility. Furthermore, the mobile terminal can be further classified into two types, such as a handheld terminal and a vehicle mount terminal based on whether or not it can be directly carried by a user.

As it becomes multifunctional, for example, such a terminal is allowed to capture still images or moving images, play music or video files, play games, receive broadcast and the like, so as to be implemented as an integrated multimedia player. Moreover, the improvement of structural or software elements of the terminal may be taken into consideration to support and enhance the functions of the terminal.

Owing to the enhancement, the terminal can support VoLTE (Voice over LTE) using an LTE network. VoLTE uses broad frequency bandwidths and high quality voice codecs as compared to 3rd generation (3G) voice calls, thus having excellent voice quality. In case of VoLTE, the call connection time could be about 20 times faster than 3G, and thus the user can switch it to a video call while making a voice call or easily share photos, videos, location information and the like. Accordingly, the need of a user interface applicable thereto when making a voice call using VoLTE has emerged.

SUMMARY OF THE INVENTION

An objective of the present disclosure is to provide a mobile terminal and control method thereof capable of enhancing the user's convenience when making a voice call using VoLTE.

A mobile terminal according to an embodiment of the present disclosure may include a display unit formed to enable a touch input and display a screen associated with a call to the counterpart when requesting a call to the counterpart; and a controller configured to switch at least a partial region of the screen to a region for receiving information when an information transmission mode is executed on the screen, and transmit information received by a touch input applied to the switched region to the counterpart.

According to an embodiment, the controller may determine a region to be switched to the region for receiving information on the screen based on a touch input applied to the screen.

According to an embodiment, the controller may transmit information received in the switched region in real time to the counterpart.

According to an embodiment, when information is received in the switched region and then a send icon is selected, the controller may transmit the received information to the counterpart.

According to an embodiment, the controller may display a menu screen containing at least one application execution menu in the switched region when a touch input is applied to the switched region.

According to an embodiment, when any one of the at least one application execution menu is selected, the controller may execute the selected application, and transmits an execution result of the application to the counterpart.

According to an embodiment, the controller may edit the at least one application execution menu on the menu screen when an edit mode for the menu screen is executed.

According to an embodiment, the controller may store information transmitted to the counterpart along with call log information for the counterpart.

According to an embodiment, the display unit may display a call log list containing a plurality of call log items, and the controller may display at least part of the information that has been transmitted to the counterpart when requesting a call to the counterpart along with a call log item for the counterpart.

According to an embodiment, the controller may allow the call log list to disappear from the display unit when the call log item for the counterpart is selected from the call log list, and display information transmitted to the counterpart along with call log information for the counterpart.

According to an embodiment, when an information transmission mode is executed on the screen and voice data is received, the controller may convert the voice data to text data to transmit it to the counterpart.

A mobile terminal according to another embodiment of the present disclosure may include a wireless communication unit formed to receive information from the counterpart when receiving a call from the counterpart; a display unit configured to display a call log list containing a plurality of call log items; and a controller configured to display at least part of the information that has been received from the counterpart upon receiving a call from the counterpart in the call log list along with a call log item for the counterpart.

According to an embodiment, the controller may display an icon corresponding to the kind of information that has been received from the counterpart along with the call log item.

According to an embodiment, the controller may allow the call log list to disappear from the display unit when the call log item for the counterpart is selected from the call log list, and display information received from the counterpart along with call log information for the counterpart.

According to an embodiment, information received from the counterpart may contain application information that has been executed by the counterpart while making a call to the counterpart.

According to an embodiment, when a touch input in a preset direction is applied to a call log item for the counterpart, the controller may display at least part of the call log information in a region displayed with the call log item for the counterpart while displaying the call log list as it is.

According to an embodiment, the display unit may display a screen associated with a call to the counterpart when receiving a call from the counterpart, and when information is received from the counterpart while making a call to the counterpart, the controller may switch at least a partial region of the screen to a region for displaying the received information.

According to an embodiment, the controller may display a preview screen of the information transmitted by the counterpart on the display unit, and receive the information from the counterpart when an input icon is selected.

A control method of a mobile terminal according to an embodiment of the present disclosure may include displaying a screen associated with a call to the counterpart when requesting a call to the counterpart on the display unit; switching at least a partial region of the screen to a region for receiving information when an information transmission mode is executed on the screen; and transmitting the information received by a touch input applied to the switched region to the counterpart.

A control method of a mobile terminal according to another embodiment of the present disclosure may include receiving information from the counterpart when receiving a call from the counterpart; displaying a call log list containing a plurality of call log items on the display unit; and displaying at least part of the information that has been received from the counterpart upon receiving a call from the counterpart along with a call log item for the counterpart in the call log list.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 is a block diagram illustrating a mobile terminal according to an embodiment disclosed in the present disclosure;

FIGS. 17 through 20 are conceptual views illustrating a user interface on which a call log list containing call log items is displayed.

DETAILED DESCRIPTION OF THE INVENTION

Figure 2A:
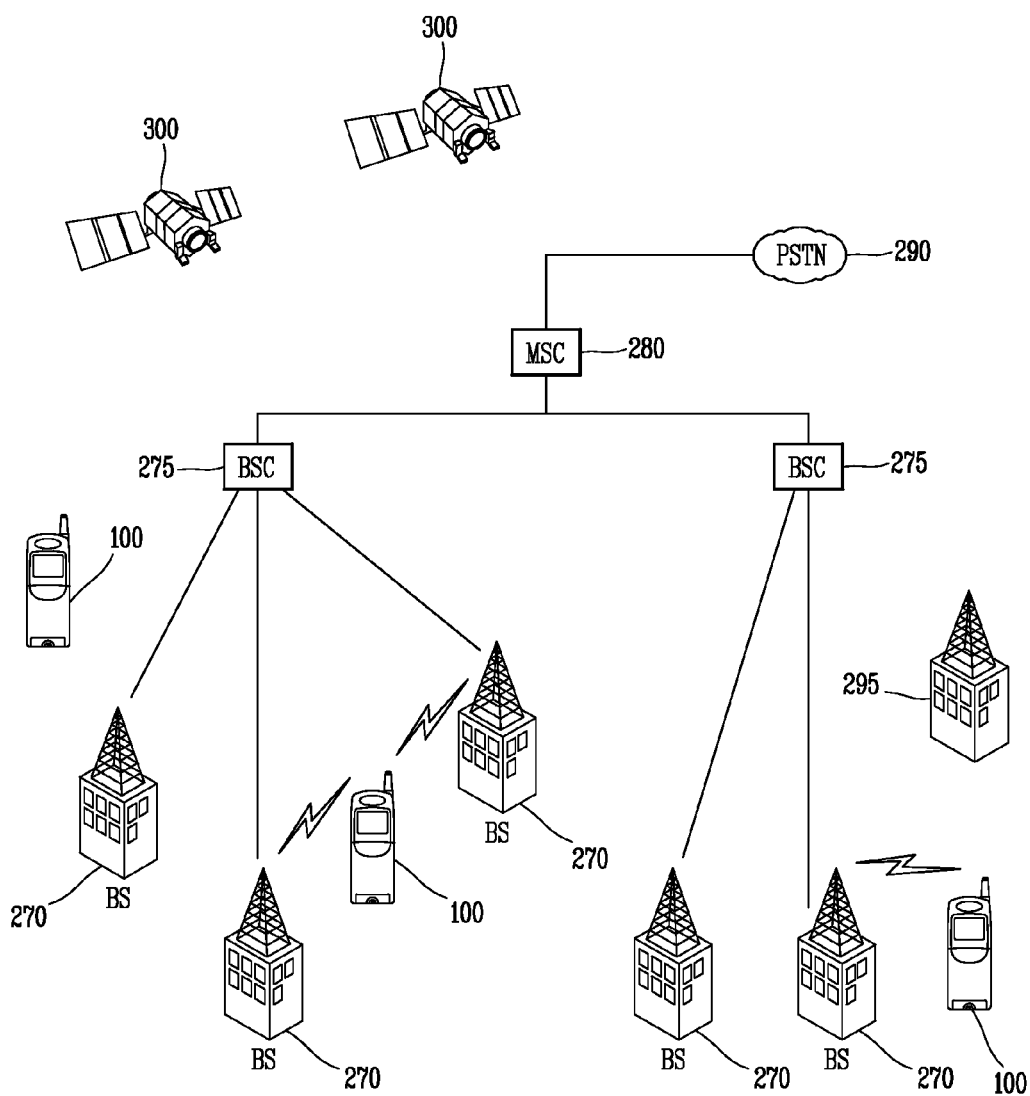
FIGS. 2A and 2B are conceptual views illustrating a communication system in which a mobile terminal according to the present disclosure is operable.

Hereinafter, preferred embodiments of the present invention will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. In describing the present invention, moreover, the detailed description will be omitted when a specific description for publicly known technologies to which the invention pertains is judged to obscure the gist of the present invention.

A mobile terminal disclosed herein may include a portable phone, a smart phone, a laptop computer, a digital broadcast mobile device, a personal digital assistant (PDA), a mobile multimedia player (PMP), a navigation, a slate PC, a tablet PC, an ultrabook, and the like. However, it would be easily understood by those skilled in the art that a configuration according to the following description may be applicable to a stationary terminal such as a digital TV, a desktop computer, and the like, excluding constituent elements particularly configured for mobile purposes.

FIG. 1 is a block diagram illustrating a mobile terminal 100 according to an embodiment disclosed in the present disclosure.

The mobile terminal 100 may include a wireless communication unit 110, an audio/video (A/V) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile communication terminal may be implemented with greater or less number of elements than those illustrated elements.

Hereinafter, the foregoing constituent elements will be described in sequence.

The wireless communication unit 110 may include one or more modules allowing radio communication between the mobile terminal 100 and a wireless communication system, or allowing radio communication between the mobile terminal 100 and a network in which the mobile terminal 100 is located. For example, the wireless communication unit 110 may include at least one of a broadcast receiving module 111, a mobile communication module 112, a wireless Internet module 113, a short-range communication module 114, a location information module 115, and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. Of course, the broadcast receiving module 111 may be configured to be suitable for every broadcast system transmitting broadcast signals as well as the digital broadcasting systems.

Broadcast signals and/or broadcast associated information received via the broadcast receiving module 111 may be stored in a memory 160.

The mobile communication module 112 transmits and receives wireless signals to and from at least one a base station, an external terminal and a server on a mobile communication network. Here, the wireless signals may include audio call signals, video call signals, or various formats of data according to the transmission and reception of text/multimedia messages.

The mobile communication module 112 may be configured to implement an video communication mode and a voice communication mode. The video communication mode refers to a configuration in which communication is made while viewing the image of the counterpart, and the voice communication mode refers to a configuration in which communication is made without viewing the image of the counterpart. The mobile communication module 112 may be configured to transmit or receive at least one of audio or video data to implement the video communication mode and voice communication mode.

The wireless Internet module 113 refers to a module for supporting wireless Internet access, and may be built-in or externally installed on the mobile terminal 100. Here, it may be used a wireless Internet access technique including WLAN (Wireless LAN), Wi-Fi (Wireless Fidelity) Direct, DLNA (Digital Living Network Alliance), Wibro (Wireless Broadband), Wimax (World Interoperability for Microwave Access), HSDPA (High Speed Downlink Packet Access), and the like.

The short-range communication module 114 refers to a module for supporting a short-range communication. Here, it may be used a short-range communication technology including Bluetooth™, Radio Frequency IDentification (RFID), Infrared Data Association (IrDA), Ultra WideBand (UWB), ZigBee, Near Field Communication (NFC) and the like.

The location information module 115 is a module for checking or acquiring the location of the mobile terminal, and there is a Global Positioning Module (GPS) module or Wireless Fidelity (WiFi) as a representative example.

Referring to FIG. 1, the A/V (audio/video) input unit 120 receives an audio or video signal, and the A/V (audio/video) input unit 120 may include a camera 121 and a microphone 122. The camera 121 processes image frames, such as still or moving images, obtained by an image sensor in a video phone call or image capturing mode. The processed image frame may be displayed on a display unit 151.

The image frames processed by the camera 121 may be stored in the memory 160 or transmitted to an external device through the wireless communication unit 110. Furthermore, the user's location information or the like may be produced from image frames acquired from the camera 121. Two or more cameras 121 may be provided according to the use environment.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like.

The sensing unit 140 detects a current status of the mobile terminal 100 such as an opened or closed configuration of the mobile terminal 100, a location of the mobile terminal 100, a presence or absence of user contact with the mobile terminal 100, an orientation of the mobile terminal 100, an acceleration/deceleration of the mobile terminal 100, and the like, so as to generate a sensing signal for controlling the operation of the mobile terminal 100. For example, when the mobile terminal 100 is a slide phone type, the sensing unit 140 may sense whether a sliding portion of the mobile terminal is open or closed. Other examples include sensing functions, such as the sensing unit 140 sensing the presence or absence of power provided by the power supply unit 190, the presence or absence of a coupling between the interface unit 170 and an external device.

The output unit 150 is configured to generate an output associated with visual sense, auditory sense or tactile sense, and may include a display unit 151, an audio output module 153, an alarm unit 154, a haptic module 155, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of those displays may be configured with a transparent or optical transparent type to allow viewing of the exterior through the display unit, which may be called transparent displays. An example of the typical transparent displays may include a transparent LCD (TOLED), and the like. Under this configuration, a user can view an object positioned at a rear side of a mobile terminal body through a region occupied by the display unit 151 of the mobile terminal body.

Two or more display units 151 may be implemented according to a configured aspect of the mobile terminal 100. For instance, a plurality of the display units 151 may be arranged on one surface to be spaced apart from or integrated with each other, or may be arranged on different surfaces.

Furthermore, the display unit 151 may be configured with a stereoscopic display unit 152 for displaying a stereoscopic image.

Here, stereoscopic image indicates a 3-dimensional stereoscopic image, and the 3-dimensional stereoscopic image is an image for allowing the user to feel the gradual depth and reality of an object located on the monitor or screen as in a real space. The 3-dimensional stereoscopic image may be implemented by using binocular disparity. Here, binocular disparity denotes a disparity made by the location of two eyes separated from each other, allowing the user to feel the depth and reality of a stereoscopic image when two eyes see different two-dimensional images and then the images are transferred through the retina and merged in the brain as a single image.

A stereoscopic method (glasses method), an auto-stereoscopic method (no-glasses method), a projection method (holographic method), and the like may be applicable to the stereoscopic display unit 152. The stereoscopic method primarily used in a home television receiver and the like may include a Wheatstone stereoscopic method and the like.

The examples of the auto-stereoscopic method may include a parallel barrier method, a lenticular method, an integral imaging method, and the like. The projection method may include a reflective holographic method, a transmissive holographic method, and the like.

In general, a 3-dimensional stereoscopic image may include a left image (image for the left eye) and a right image (image for the right eye). The method of implementing a 3-dimensional stereoscopic image can be divided into a top-down method in which a left image and a right image are disposed at the top and bottom within a frame, a left-to-right (L-to-R) or side by side method in which a left image and a right image are disposed at the left and right within a frame, a checker board method in which the pieces of a left image and a right image are disposed in a tile format, an interlaced method in which a left and a right image are alternately disposed for each column and row unit, and a time sequential or frame by frame method in which a left image and a right image are alternately displayed for each time frame, according to the method of combining a left image and a right image into a 3-dimensional stereoscopic image.

For 3-dimensional thumbnail images, a left image thumbnail and a right image thumbnail may be generated from the left and the right image of the original image frame, and then combined with each other to generate a 3-dimensional stereoscopic image. Typically, thumbnail denotes a reduced image or reduced still video. The left and right thumbnail image generated in this manner are displayed with a left and right distance difference on the screen in a depth corresponding to the disparity of the left and right image, thereby implementing a stereoscopic space feeling.

A left image and a right image required to implement a 3-dimensional stereoscopic image are displayed on the stereoscopic display unit 152 by a stereoscopic processing unit (not shown). The stereoscopic processing unit receives a 3D image to extract a left image and a right image from the 3D image, or receives a 2D image to convert it into a left image and a right image.

On the other hand, when the display unit 151 and a touch sensitive sensor (hereinafter, referred to as a "touch sensor") have an interlayer structure (hereinafter, referred to as a "touch screen"), the display unit 151 may be used as an input device in addition to an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. The touch sensor may be configured to sense not only a touched position and a touched area, but also a touch pressure at which a touch object body is touched on the touch sensor. Here, the touch object body may be a finger, a touch pen or stylus pen, a pointer, or the like as an object by which a touch is applied to the touch sensor.

When there is a touch input to the touch sensor, the corresponding signals are transmitted to a touch controller. The touch controller processes the signal(s), and then transmits the corresponding data to the controller 180. Accordingly, the controller 180 may sense which region of the display unit 151 has been touched.

Referring to FIG. 1, a proximity sensor 141 may be arranged at an inner region of the mobile device 100 surrounded by the touch screen, or adjacent to the touch screen. The proximity sensor 141 may be provided as an example of the sensing unit 140. The proximity sensor 141 refers to a sensor to sense the presence or absence of an object approaching to a surface to be sensed, or an object disposed adjacent to a surface to be sensed, by using an electromagnetic field or infrared rays without a mechanical contact. The proximity sensor 141 has a longer lifespan and a more enhanced utility than a contact sensor.

The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity of an object having conductivity (hereinafter, referred to as a "pointer") to the touch screen is sensed by changes of an electromagnetic field. In this case, the touch screen (touch sensor) may be categorized into a proximity sensor.

Hereinafter, for the sake of convenience of brief explanation, a behavior that the pointer is positioned to be proximate onto the touch screen without contact will be referred to as a "proximity touch", whereas a behavior that the pointer substantially comes in contact with the touch screen will be referred to as a "contact touch". For the position corresponding to the proximity touch of the pointer on the touch screen, such position corresponds to a position where the pointer faces perpendicular to the touch screen upon the proximity touch of the pointer.

The proximity sensor 141 senses a proximity touch, and a proximity touch pattern (e.g., proximity touch distance, proximity touch direction, proximity touch speed, proximity touch time, proximity touch position, proximity touch moving status, etc.). Information relating to the sensed proximity touch and the sensed proximity touch patterns may be output onto the touch screen.

When the stereoscopic display unit 152 and a touch sensor are configured with an interlayer structure (hereinafter, referred to as a "stereoscopic touch screen") or the stereoscopic display unit 152 and a 3D sensor for detecting a touch operation are combined with each other, the stereoscopic display unit 152 may be used as a 3-dimensional input device.

As an example of the 3D sensor, the sensing unit 140 may include a proximity sensor 141, a stereoscopic touch sensing unit 142, a ultrasound sensing unit 143, and a camera sensing unit 144.

The proximity sensor 141 measures a distance between the sensing object (for example, the user's finger or stylus pen) and a detection surface to which a touch is applied using an electromagnetic field or infrared rays without a mechanical contact. The terminal may recognize which portion of a stereoscopic image has been touched by using the measured distance. In particular, when the touch screen is implemented with a capacitance type, it may be configured such that the proximity level of a sensing object is sensed by changes of an electromagnetic field according to the proximity of the sensing object to recognize a 3-dimensional touch using the proximity level.

The stereoscopic touch sensing unit 142 may be configured to sense the strength or duration time of a touch applied to the touch screen. For example, stereoscopic touch sensing unit 142 senses a user applied touch pressure, and if the applied pressure is strong, then the stereoscopic touch sensing unit 142 recognizes it as a touch for an object located farther from the touch screen.

The ultrasound sensing unit 143 may be configured to sense the location of the sensing object using ultrasound.

For example, the ultrasound sensing unit 143 may be configured with an optical sensor and a plurality of ultrasound sensors. The optical sensor may be formed to sense light, and the ultrasound sensor may be formed to sense ultrasound waves. Since light is far faster than ultrasound waves, the time for light to reach the optical sensor is far faster than the time for ultrasound waves to reach the ultrasound sensor. Accordingly, the location of the wave generating source may be calculated using a time difference between the light and ultrasound waves to reach the optical sensor.

The camera sensing unit 144 may include at least one of a camera 121, a photo sensor, and a laser sensor.

For example, the camera 121 and laser sensor may be combined to each other to sense a touch of the sensing object to a 3-dimensional stereoscopic image. Distance information sensed by the laser sensor is added to a two-dimensional image captured by the camera to acquire 3-dimensional information.

For another example, a photo sensor may be deposited on the display element. The photo sensor may be configured to scan the motion of the sensing object in proximity to the touch screen. More specifically, the photo sensor is integrated with photo diodes and transistors in the rows and columns thereof, and a content placed on the photo sensor may be scanned by using an electrical signal that is changed according to the amount of light applied to the photo diode. In other words, the photo sensor performs the coordinate calculation of the sensing object according to the changed amount of light, and the location coordinate of the sensing object may be detected through this.

The audio output module 153 may output audio data received from the wireless communication unit 110 or stored in the memory 160, in a call-receiving mode, a call-placing mode, a recording mode, a voice recognition mode, a broadcast reception mode, and so on. The audio output module 153 may output audio signals relating to the functions performed in the mobile terminal 100 (e.g., sound alarming a call received or a message received, and so on). The audio output module 153 may include a receiver, a speaker, a buzzer, and so on.

The alarm 154 outputs signals notifying occurrence of events from the mobile terminal 100. The events occurring from the mobile terminal 100 may include call received, message received, key signal input, touch input, and so on. The alarm 154 may output not only video or audio signals, but also other types of signals such as signals notifying occurrence of events in a vibration manner. Since the video or audio signals can be output through the display unit 151 or the audio output unit 153, the display unit 151 and the audio output module 153 may be categorized into part of the alarm 154.

The haptic module 155 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 155 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 155 may be configured to transmit tactile effects through a user's direct contact, or a user's muscular sense using a finger or a hand. The haptic module 155 may be implemented in two or more in number according to the configuration of the mobile terminal 100.

The memory 160 may store a program for processing and controlling the controller 180. Alternatively, the memory 160 may temporarily store input/output data (e.g., phonebook, messages, still images, videos, and the like). Also, the memory 160 may store data related to various patterns of vibrations and sounds outputted upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate in association with a web storage which performs the storage function of the memory 160 on the Internet.

The interface unit 170 may generally be implemented to interface the mobile terminal with external devices connected to the mobile terminal 100. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

On the other hand, the identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the mobile terminal 100 via a port.

Furthermore, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like.

The controller 180 may include a multimedia module 181 which provides multimedia playback. The multimedia module 181 may be configured as part of the controller 180 or as a separate component.

Furthermore, the controller 180 can perform a pattern recognition processing so as to recognize writing or drawing input carried out on the touch screen as text or image.

Furthermore, the controller 180 may implement a lock state for limiting the user's control command input to applications when the state of the mobile terminal satisfies a preset condition. Furthermore, the controller 180 may control a lock screen displayed in the lock state based on a touch input sensed through the display unit 151 in the lock state.

The power supply unit 190 receives external and internal power to provide power required for various components under the control of the controller 180.

Various embodiments described herein may be implemented in a computer or similar device readable medium using software, hardware, or any combination thereof.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform the functions described herein. In some cases, such embodiments may be implemented in the controller 180 itself.

For software implementation, the embodiments such as procedures or functions described in the present disclosure may be implemented with separate software modules. Each of the software modules may perform at least one function or operation described in the present disclosure.

Software codes can be implemented by a software application written in any suitable programming language. The software codes may be stored in the memory 160 and executed by the controller 180.

Next, a communication system that can be implemented through the mobile terminal 100 according to the present disclosure will be described.

Figure 2B:
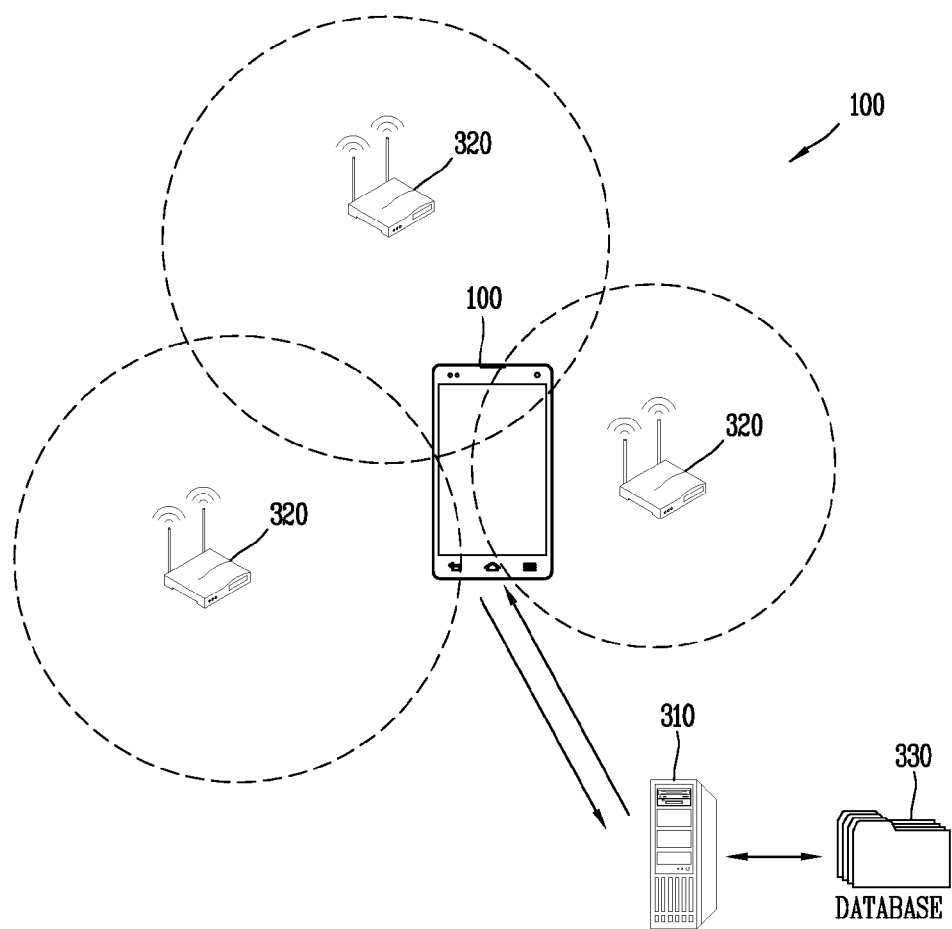

FIGS. 2A and 2B are conceptual views illustrating a communication system in which a mobile terminal 100 according to the present disclosure is operable.

First, referring to FIG. 2A, the communication system may use different wireless interfaces and/or physical layers. For example, wireless interfaces that can be used by the communication system may include, frequency division multiple access (FDMA), time division multiple access (TDMA), code division multiple access (CDMA), universal mobile telecommunications system (UMTS) (particularly, long term evolution (LTE)), global system for mobile communications (GSM), and the like.

Hereinafter, for the sake of convenience of explanation, the description disclosed herein will be limited to CDMA. However, it is apparent that the present invention may be also applicable to all communication systems including a CDMA wireless communication system.

As illustrated in FIG. 2A, a CDMA wireless communication system may include a plurality of terminals 100, a plurality of base stations (BSs) 270, a plurality of base station controllers (BSCs) 275, and a mobile switching center (MSC) 280. The MSC 280 may interface with a Public Switched Telephone Network (PSTN) 290, and the MSC 280 may also interface with the BSCs 275. The BSCs 275 may be connected to the BSs 270 via backhaul lines. The backhaul lines may be configured in accordance with at least any one of E1/T1, ATM, IP, PPP, Frame Relay, HDSL, ADSL, or xDSL, for example. Further, the system illustrated in FIG. 2A may include a plurality of BSCs 275.

Each of the plurality of BSs 270 may include at least one sector, each sector having an omni-directional antenna or an antenna indicating a particular radial direction from the base station 270. Alternatively, each sector may include two or more antennas with various forms. Each of the BSs 270 may be configured to support a plurality of frequency assignments, each frequency assignment having a particular spectrum (for example, 1.25 MHz, 5 MHz, etc.).

The intersection of a sector and frequency assignment may be referred to as a CDMA channel. The BSs 270 may also be referred to as Base Station Transceiver Subsystems (BTSs). In this case, the term "base station" may collectively refer to a BSC 275, and at least one BS 270. The base stations may also indicate "cell sites". Alternatively, individual sectors for a specific BS 270 may also be referred to as a plurality of cell sites.

As illustrated in FIG. 2A, the Broadcasting Transmitter (BT) 295 may transmit broadcasting signals to the mobile terminals 100 being operated within the system. The broadcast receiving module 111 as illustrated in FIG. 1 may be is provided in the mobile terminal 100 to receive broadcast signals transmitted by the BT 295.

In addition, FIG. 2A illustrates several global positioning system (GPS) satellites 300. Such satellites 300 facilitate locating at least one of a plurality of mobile terminals 100. Though two satellites are illustrated in FIG. 2A, location information may be obtained with a greater or fewer number of satellites. The location information module 115 as illustrated in FIG. 1 may cooperate with the satellites 300 as illustrated in FIG. 2A to obtain desired location information. However, other types of position detection technology, all types of technologies capable of tracing the location may be used in addition to a GPS location technology. Furthermore, at least one of the GPS satellites 300 may alternatively or additionally provide satellite DMB transmissions.

During the operation of a wireless communication system, the BS 270 may receive reverse-link signals from various mobile terminals 100. At this time, he mobile terminals 100 may perform calls, message transmissions and receptions, and other communication operations. Each reverse-link signal received by a specific base station 270 may be processed within that specific base station 270. The processed resultant data may be transmitted to an associated BSC 275. The BSC 275 may provide call resource allocation and mobility management functions including the systemization of soft handoffs between the base stations 270. Furthermore, the BSCs 275 may also transmit the received data to the MSC 280, which provides additional transmission services for interfacing with the PSTN 290. Furthermore, similarly, the PSTN 290 may interface with the MSC 280, and the MSC 280 may interface with the BSCs 275. The BSCs 275 may also control the BSs 270 to transmit forward-link signals to the mobile terminals 100.

Next, a method of acquiring the location information of a mobile terminal using a WiFi (Wireless Fidelity) positioning system (WPS) will be described with reference to FIG. 2B.

The WiFi positioning system (WPS) 300 refers to a location determination technology based on a wireless local area network (WLAN) using WiFi as a technology for tracking the location of the mobile terminal 100 using a WiFi module provided in the mobile terminal 100 and a wireless access point 320 for transmitting and receiving to and from the WiFi module.

The WiFi positioning system 300 may include a WiFi location determination server 310, a mobile terminal 100, a wireless access point (AP) 320 connected to the mobile terminal 100, and a database 330 stored with any wireless AP information.

The WiFi location determination server 310 extracts the information of the wireless AP 320 connected to the mobile terminal 100 based on a location information request message (or signal) of the mobile terminal 100. The information of the wireless AP 320 may be transmitted to the WiFi location determination server 310 through the mobile terminal 100 or transmitted to the WiFi location determination server 310 from the wireless AP 320.

The information of the wireless AP extracted based on the location information request message of the mobile terminal 100 may be at least one of MAC address, SSID, RSSI, channel information, privacy, network type, signal strength and noise strength.

The WiFi location determination server 310 receives the information of the wireless AP 320 connected to the mobile terminal 100 as described above, and compares the received wireless AP 320 information with information contained in the pre-established database 330 to extract (or analyze) the location information of the mobile terminal 100.

On the other hand, referring to FIG. 2B, as an example, the wireless AP connected to the mobile terminal 100 is illustrated as a first, a second, and a third wireless AP 320. However, the number of wireless APs connected to the mobile terminal 100 may be changed in various ways according to a wireless communication environment in which the mobile terminal 100 is located. When the mobile terminal 100 is connected to at least one of wireless APs, the WiFi positioning system 300 can track the location of the mobile terminal 100.

Next, considering the database 330 stored with any wireless AP information in more detail, various information of any wireless APs disposed at different locations may be stored in the database 330.

The information of any wireless APs stored in the database 330 may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like.

In this manner, any wireless AP information and location information corresponding to the any wireless AP are stored together in the database 330, and thus the WiFi location determination server 310 may retrieve wireless AP information corresponding to the information of the wireless AP 320 connected to the mobile terminal 100 from the database 330 to extract the location information matched to the searched wireless AP, thereby extracting the location information of the mobile terminal 100.

Furthermore, the extracted location information of the mobile terminal 100 may be transmitted to the mobile terminal 100 through the WiFi location determination server 310, thereby acquiring the location information of the mobile terminal 100.

Hereinafter, a mobile terminal according to an embodiment of the present disclosure as illustrated in FIG. 1 or a mobile terminal disposed with the constituent elements of the mobile terminal or the structure of a mobile terminal will be described.

Figure 3A:
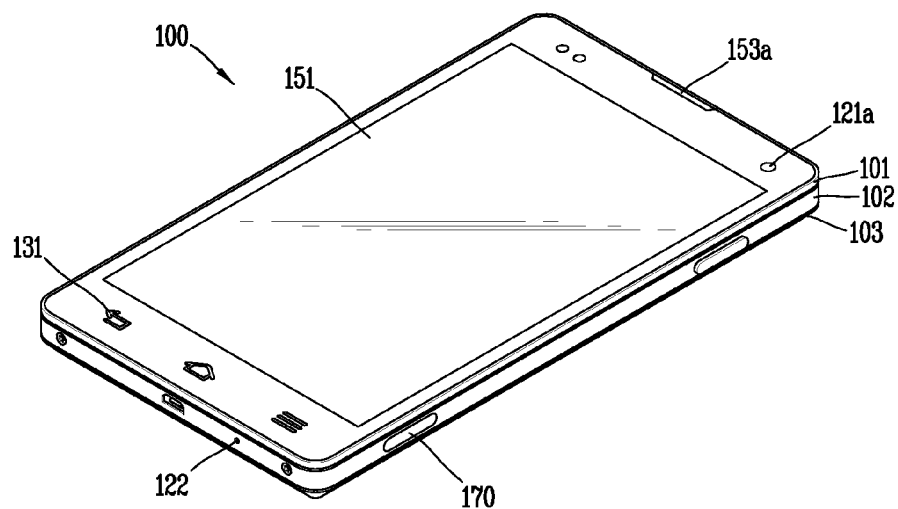
FIG. 3A is a front perspective view illustrating an example of a mobile terminal associated with the present disclosure.

FIG. 3A is a front perspective view illustrating an example of the mobile terminal 100 associated with the present disclosure.

The mobile terminal 100 disclosed herein is provided with a bar-type terminal body. However, the present invention may not be limited to this, but also may be applicable to various structures such as watch type, clip type, glasses type or folder type, flip type, swing type, swivel type, or the like, in which two and more bodies are combined with each other in a relatively movable manner.

The body includes a case (casing, housing, cover, etc.) forming the appearance of the terminal. In this embodiment, the case may be divided into a front case 101 and a rear case 102. Various electronic components is incorporated into a space formed between the front case 101 and the rear case 102. At least one middle case may be additionally disposed between the front case 101 and the rear case 102, and a battery cover 103 for covering the battery 191 may be detachably configured at the rear case 102.

The cases may be formed by injection-molding a synthetic resin or may be also formed of a metal, for example, stainless steel (STS), titanium (Ti), or the like.

A display unit 151, a first audio output module 153a, a first camera 121a, a first manipulating unit 131 and the like may be disposed on a front surface of the terminal body, and a microphone 122, an interface unit 170, a second manipulating unit 132 and the like may be provided on a lateral surface thereof.

The display unit 151 may be configured to display (output) information being processed in the mobile terminal 100. The display unit 151 may include at least one of a liquid crystal display (LCD), a thin film transistor-liquid crystal display (TFT-LCD), an organic light emitting diode (OLED) display, a flexible display, a 3-dimensional (3D) display, and an e-ink display.

The display unit 151 may include a touch sensing means to receive a control command by a touch method. When a touch is made to any one place on the display unit 151, the touch sensing means may be configured to sense this touch and enter the content corresponding to the touched place. The content entered by a touch method may be a text or numerical value, or a menu item capable of indication or designation in various modes.

The touch sensing means may be formed with transparency to allow visual information displayed on the display unit 151 to be seen, and may include a structure for enhancing the visibility of a touch screen at bright places. Referring to FIG. 3A, the display unit 151 occupies a most portion of the front surface of the front case 101.

The first audio output unit 153a and the first camera 121a are disposed in a region adjacent to one of both ends of the display unit 151, and the first manipulation input unit 131 and the microphone 122 are disposed in a region adjacent to the other end thereof. The second manipulation interface 132 (refer to FIG. B), the interface 170, and the like may be disposed on a lateral surface of the terminal body.

The first audio output module 153a may be implemented in the form of a receiver for transferring voice sounds to the user's ear or a loud speaker for outputting various alarm sounds or multimedia reproduction sounds.

It may be configured such that the sounds generated from the first audio output module 153a are released along an assembly gap between the structural bodies. In this case, a hole independently formed to output audio sounds may not be seen or hidden in terms of appearance, thereby further simplifying the appearance of the mobile terminal 100. However, the present invention may not be limited to this, but a hole for releasing the sounds may be formed on the window.

The first camera 121a processes video frames such as still or moving images obtained by the image sensor in a video call mode or capture mode. The processed video frames may be displayed on the display unit 151.

The user input unit 130 is manipulated to receive a command for controlling the operation of the mobile terminal 100. The user input unit 130 may include a first and a second manipulation unit 131, 132. The first and the second manipulation unit 131, 132 may be commonly referred to as a manipulating portion, and any method may be employed if it is a tactile manner allowing the user to perform manipulation with a tactile feeling such as touch, push, scroll or the like.

In the present drawing, it is illustrated on the basis that the first manipulation unit 131 is a touch key, but the present disclosure may not be necessarily limited to this. For example, the first manipulation unit 131 may be configured with a mechanical key, or a combination of a touch key and a mechanical key.

The content received by the first and/or second manipulation units 131, 132 may be set in various ways. For example, the first manipulation unit 131 may be used to receive a command such as menu, home key, cancel, search, or the like, and the second manipulation unit 132 may receive a command, such as controlling a volume level being outputted from the first audio output module 153a, or switching into a touch recognition mode of the display unit 151.

The microphone 122 may be formed to receive the user's voice, other sounds, or the like. The microphone 122 may be provided at a plurality of places, and configured to receive stereo sounds.

The interface unit 170 serves as a path allowing the mobile terminal 100 to exchange data with external devices. For example, the interface unit 170 may be at least one of a connection terminal for connecting to an earphone in a wired or wireless manner, a port for near field communication (for example, an Infrared Data Association (IrDA) port, a Bluetooth port, a wireless LAN port, and the like), and a power supply terminal for supplying power to the mobile terminal 100. The interface unit 170 may be implemented in the form of a socket for accommodating an external card such as Subscriber Identification Module (SIM) or User Identity Module (UIM), and a memory card for information storage.

Figure 3B:
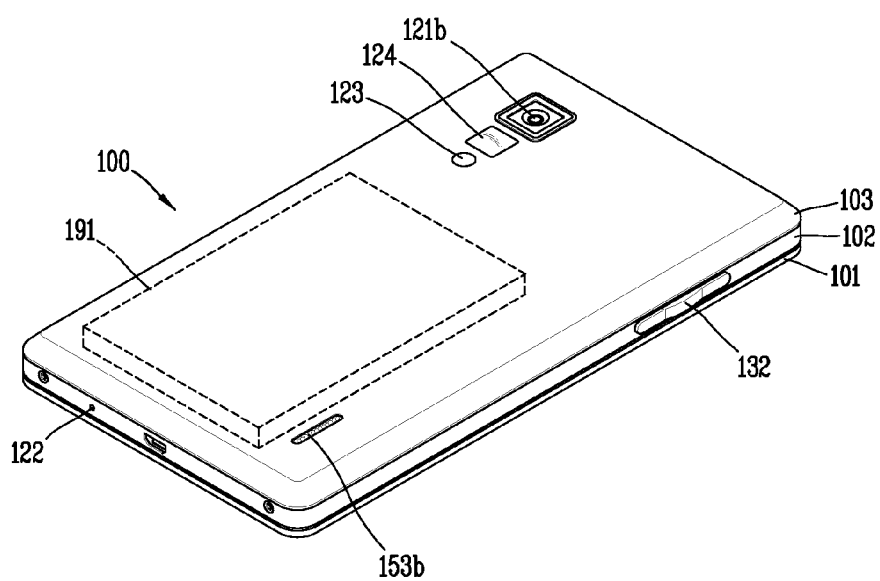
FIG. 3B is a rear perspective view illustrating a mobile terminal illustrated in FIG. 3A.

FIG. 3B is a rear perspective view illustrating mobile terminal 100 illustrated in FIG. 3A.

Referring to FIG. 3B, a second camera 121b may be additionally mounted at a rear surface of the terminal body, namely, the rear case 102. The second camera 121b has an image capturing direction, which is substantially opposite to the direction of the first camera unit 121a (refer to FIG. 3A), and may have a different number of pixels from that of the first camera unit 121a.

For example, it is preferable that the first camera 121a has a relatively is small number of pixels enough not to cause difficulty when the user captures his or her own face and sends it to the other party during a video call or the like, and the second camera 121b has a relatively large number of pixels since the user often captures a general object that is not sent immediately. The first and the second camera 121a, 121b may be provided in the terminal body in a rotatable and popupable manner.

Furthermore, a flash 123 and a mirror 124 may be additionally disposed adjacent to the second camera 121b. The flash 123 illuminates light toward an object when capturing the object with the second camera 121b. The mirror 124 allows the user to look at his or her own face, or the like, in a reflected way when capturing himself or herself (in a self-portrait mode) by using the second camera 121b.

A second audio output unit 153b may be additionally disposed at a rear surface of the terminal body. The second audio output unit 153b together with the first audio output unit 153a (refer to FIG. 3A) can implement a stereo function, and may be also used to implement a speaker phone mode during a phone call.

An antenna (not shown) for receiving broadcast signals may be additionally disposed at a lateral surface of the terminal body in addition to an antenna for making a phone call or the like. The antenna constituting part of the broadcast receiving module 111 (refer to FIG. 1) may be provided in the terminal body in a retractable manner.

A power supply unit 190 (refer to FIG. 1) for supplying power to the mobile terminal 100 may be mounted on the terminal body. The power supply unit 190 may be incorporated into the terminal body, or may include a battery 191 configured in a detachable manner on the outside of the terminal body. According to the drawing, it is illustrated that the battery cover 103 is combined with the rear case 102 to cover the battery 191, thereby restricting the battery 191 from being released and protecting the battery 191 from external shocks and foreign substances.

On the other hand, the mobile terminal 100 can support VoLTE (Voice over LTE) using an LTE network. VoLTE uses broad frequency bandwidths and high quality voice codecs as compared to 3rd generation (3G) voice calls, thus having excellent voice quality. In case of VoLTE, the call connection time could be about 20 times faster than 3G, and thus the user can switch it to a video call while making a voice call or easily share photos, videos, location information and the like. Accordingly, the need of a user interface applicable thereto when making a voice call using VoLTE has emerged.

Accordingly, hereinafter, a mobile terminal 100 capable of enhancing the user's convenience when making a voice call using VoLTE and a control method thereof will be described with reference to the accompanying drawings.

Figure 4:
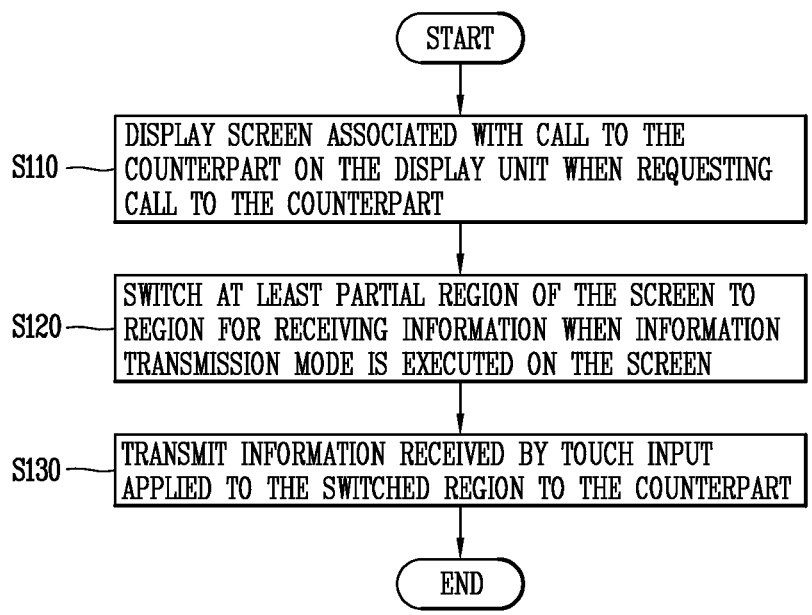
FIG. 4 is a flow chart for explaining a mobile terminal according to an embodiment of the present disclosure.

FIG. 4 is a flow chart for explaining the mobile terminal according 100 (refer to FIG. 1) to an embodiment of the present disclosure. The mobile terminal 100 may include a display unit 151 (refer to FIG. 1) and a controller 180 (refer to FIG. 1).

Referring to FIG. 4, first, the process (S110) of displaying a screen (or a graphic user interface, GUI) associated with a call to the counterpart when requesting a call to the counterpart is carried out. Further, the display unit 151 is a touch sensitive display unit.

When the user requests a call to the counterpart, a call standby screen may be displayed on the display unit 151. Furthermore, when the user requests a call to the counterpart and the counterpart accepts it, an active call screen may be displayed on the display unit 151.

Next, when an information transmission mode is executed on the screen, the process (S120) of switching at least a partial region of the screen to a region for receiving information is carried out.

In a state that a call standby screen or active call screen is displayed on the display unit 151, the controller 180 may determine a region to be switched to a region for receiving information on the screen based on a touch input applied to the screen. For example, when a first touch input is applied to the screen, the controller 180 may switch a partial region of the screen to a region for receiving information. Meanwhile, when a second touch input different from the first touch input is applied to the screen, the controller 180 may switch the entire region of the screen to a region for receiving information.

Furthermore, the controller 180 may determine whether to receive information according to the trace of a touch input applied to the display unit 151 or receive information according to an input applied to a virtual keypad. In case of the former, the user may enter image information according to the trace of a touch input using his or her finger or stylus pen. In case of the latter, the use may input text information using a virtual keypad.

Then, the process (S130) of transmitting information received by a touch input applied to the switched region to the counterpart is carried out.

The controller 180 may transmit information received in the switched region in real time to the counterpart. Meanwhile, when information is received in the switched region and then a send icon is selected, the controller 180 may transmit the received information to the counterpart.

Furthermore, the controller 180 may transmit voice information, image information and text information previously stored in the memory 160 (refer to FIG. 1) as well as image information and text information received by the user to the counterpart. Furthermore, the controller 180 may transmit information associated with an application executed by the user when the user is in a call standby state or active call state with the counterpart to the counterpart.

As described above, according to the present disclosure, information entered by the user during a voice call may be transmitted to the counterpart's terminal. Accordingly, the user and the counterpart can continue to share various information containing visual information while their voice call is not disconnected.

Furthermore, information transmitted by the user during a voice call may be stored in the counterpart's terminal. Accordingly, the counterpart can intuitively check information received from the user through a call log item. As a result, it may be possible to enhance the user's and the counterpart's convenience during a voice call.

Figure 5:
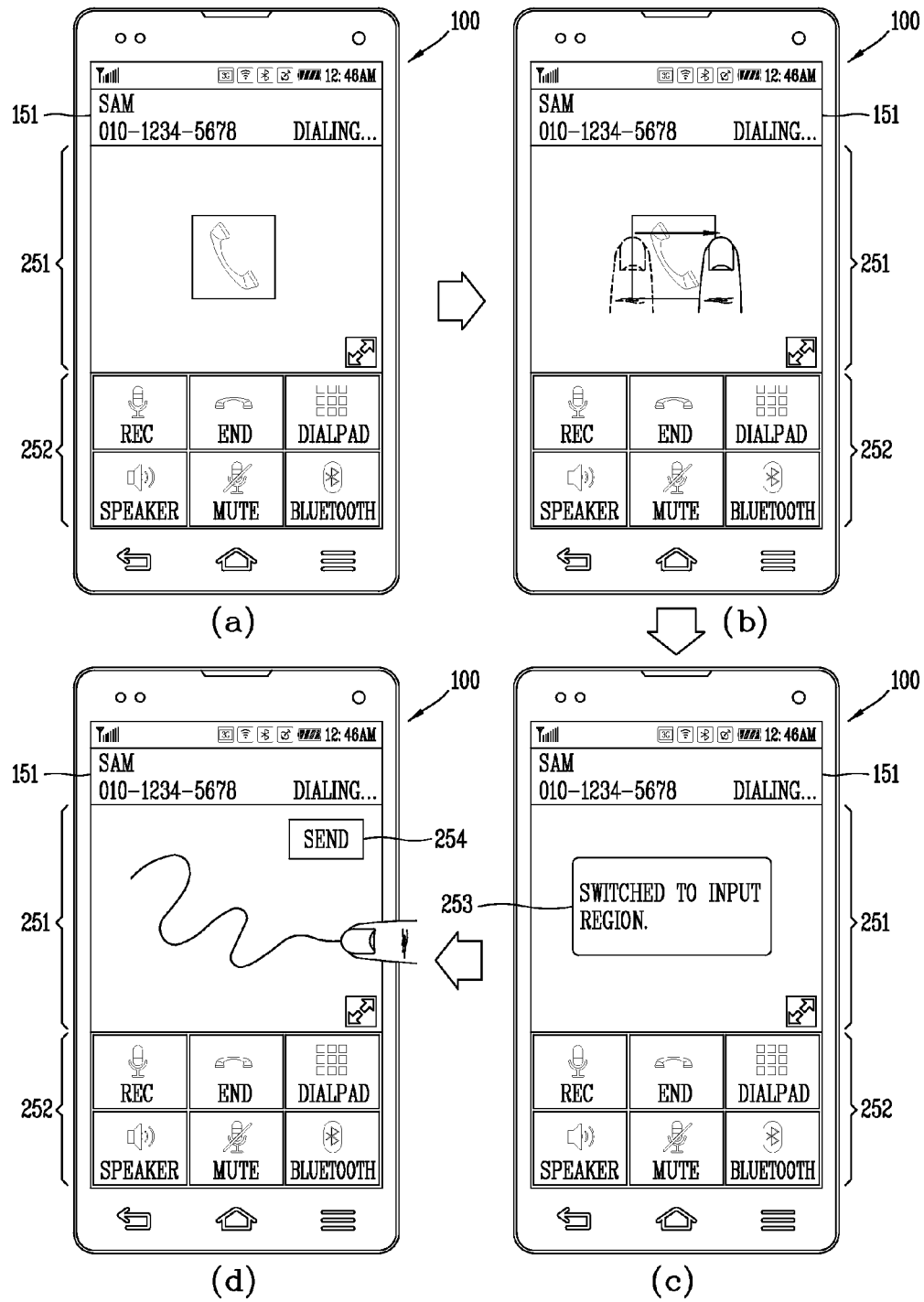
FIG. 5 is a conceptual view illustrating a user interface for receiving information to be transmitted to the counterpart on a talk standby screen.

FIG. 5 is a conceptual view illustrating a user interface for receiving information to be transmitted to the counterpart on a talk standby screen. The mobile terminal 100 may include a display unit 151 and a controller 180 (refer to FIG. 1).

Referring to FIG. 5(a), a call standby screen may be displayed on the to display unit 151 while requesting a call to the counterpart. As illustrated in the drawing, a call standby screen may be divided into a first region 251 for displaying the counterpart's thumbnail image (a call thumbnail image when the counterpart's thumbnail image is not stored therein) and a second region 252 for displaying icons associated with a call function.

At this time, referring to FIGS. 5(b) and (c), when a drag input is applied to the first region 251, the controller 180 may switch the first region 251 to a region for receiving information (hereinafter, referred to as an "input region").

While the first region 251 is switched to the input region, a popup window 253 indicating that the first region 251 has been switched to the input region may be displayed on the display unit 151. Though not shown in the drawing, a message indicating that the first region 251 is currently in a state that the first region 251 has been switched to the input region may be continuously displayed in part of the input region.

Then, referring to FIG. 5(d), the controller 180 may receive information according to the trace of a touch input applied to the display unit 151. Accordingly, the user may enter image information according to the trace of a touch input using his or her finger or stylus pen.

At this time, a send icon 254 may be displayed in a portion of the input region. When information is received and then the send icon 254 is selected, the received information may be transmitted to the counterpart.

Figure 6:
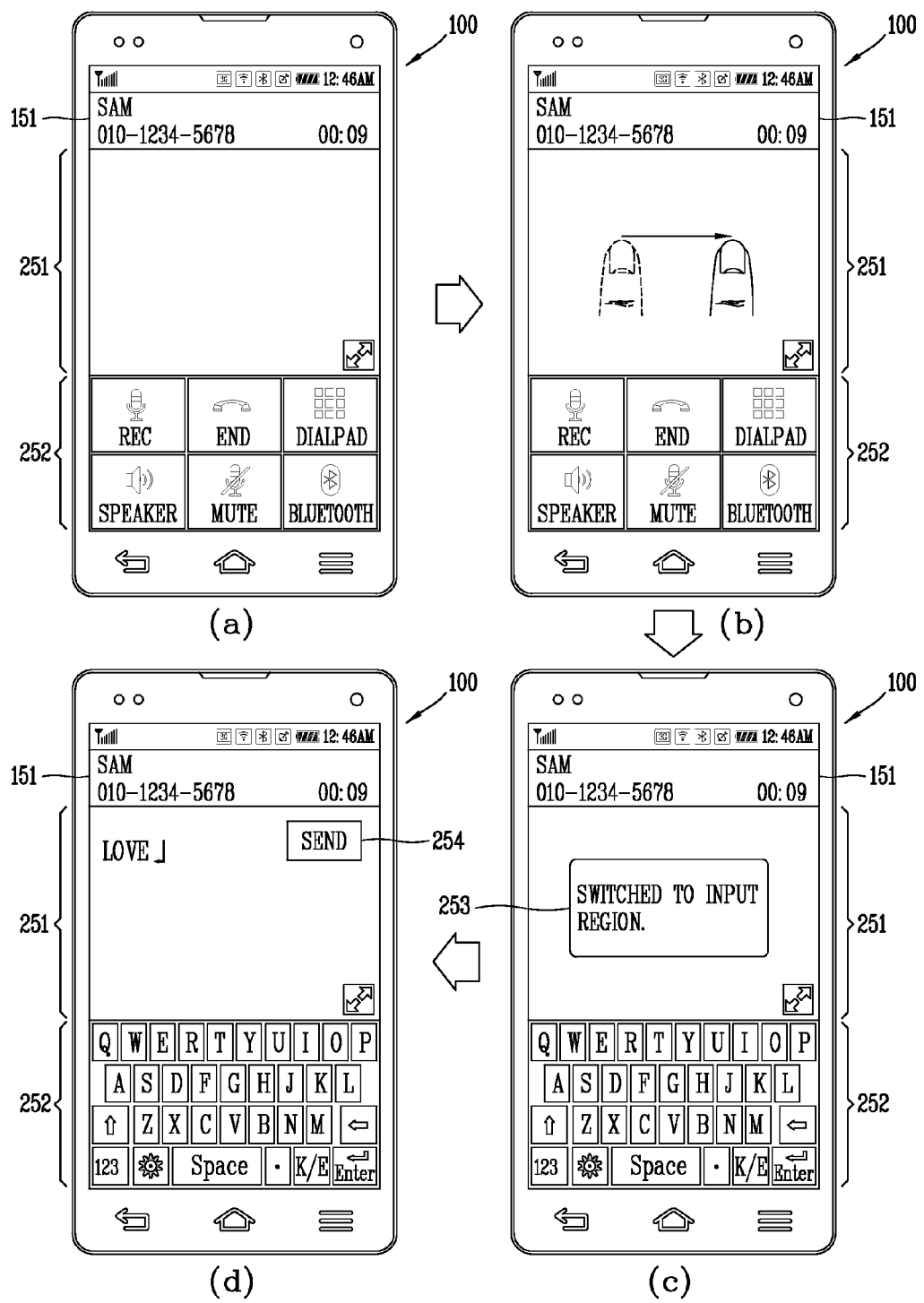
FIG. 6 is a conceptual view illustrating a user interface for receiving information to be transmitted to the counterpart on an active call screen.

FIG. 6 is a conceptual view illustrating a user interface for receiving information to be transmitted to the counterpart on an active call screen. The mobile terminal 100 may include a display unit 151 and a controller 180 (refer to FIG. 1).

Referring to FIG. 6(a), an active call screen may be displayed on the display unit 151. The active call screen may be divided into a first region 251 for displaying the counterpart's thumbnail image and a second region 252 for displaying icons associated with a call function. As illustrated in the drawing, when the counterpart's thumbnail image is not stored therein, nothing may be displayed in the first region 251. Meanwhile, while the user is making a video call to the counterpart, an image received from the counterpart may be displayed in the first region 251.

Referring to FIGS. 6(b) and (c), when a drag input is applied to the first region 251, the controller 180 may switch the first region 251 to a region for receiving information (hereinafter, referred to as an "input region"). At this time, a popup window 253 indicating that the first region 251 has been switched to the input region may be displayed on the display unit 151. At the same time, the controller 180 may display a virtual keypad in the second region 252.

Then, referring to FIG. 6(d), the controller 180 may receive information based on an input applied to the virtual keypad. Accordingly, the user may enter text information using the virtual keypad.

Though not shown in the drawing, the user may determine whether to enter image information according to the trace of a touch input or enter text information using the virtual keypad. For example, when a preset icon is selected in a mode for receiving text information using the virtual keypad (hereinafter, referred to as a "handwriting mode"), it may be switched to a mode for receiving image information according to the trace of a touch input (hereinafter, referred to as a "text input mode").

Furthermore, though not shown in the drawing, the controller 180 may determine whether to switch the first region 251 to an input region or switch to a handwriting region based on the direction of a drag input applied to the first region 251.

Figure 7:
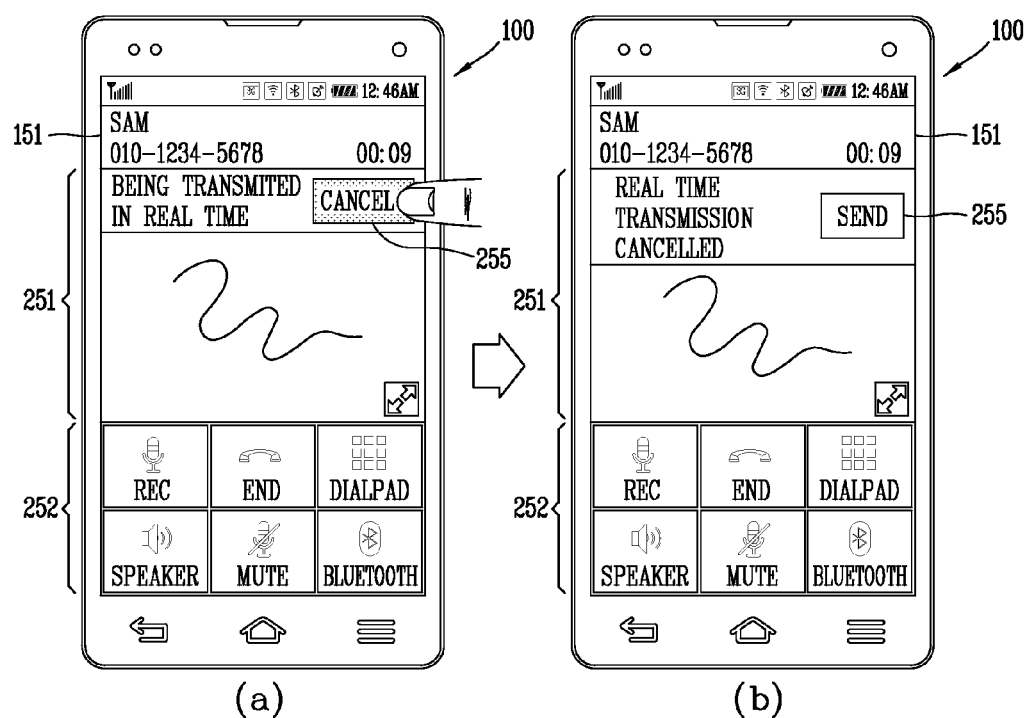
FIGS. 7 and 8 are conceptual views illustrating a user interface for transmitting the received information to the counterpart.
Figure 8:
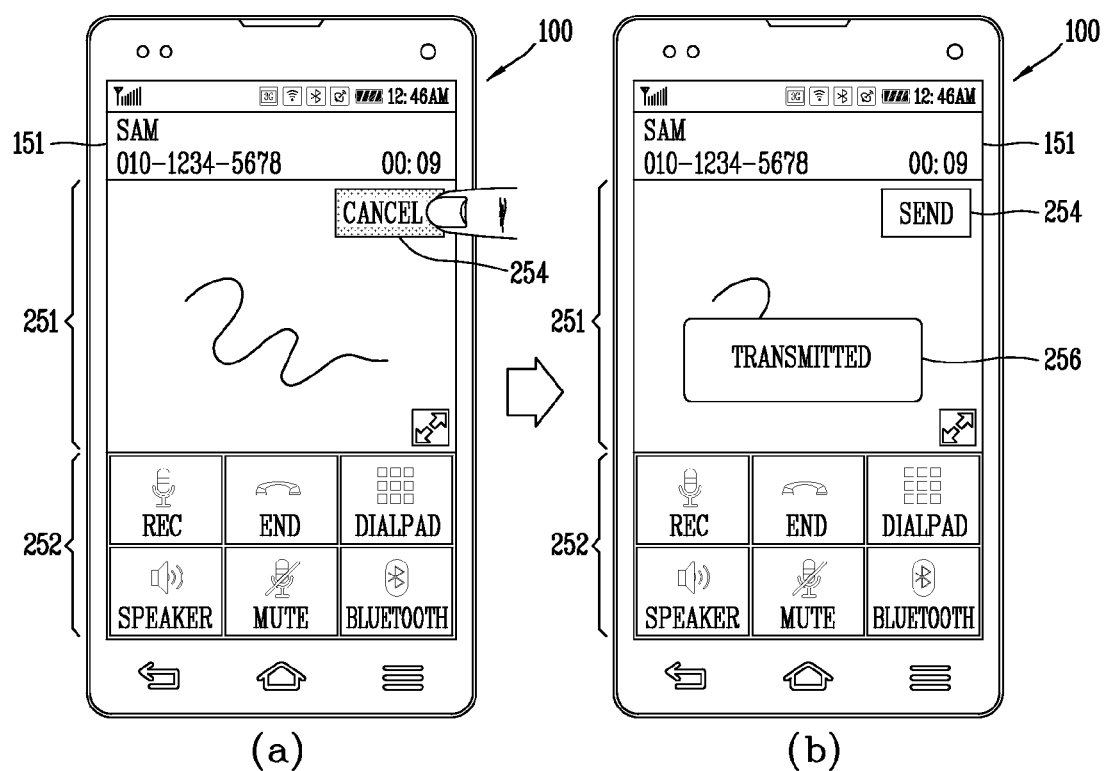

FIGS. 7 and 8 are conceptual views illustrating a user interface for transmitting the received information to the counterpart. The mobile terminal 100 may include a display unit 151 and a controller 180 (refer to FIG. 1).

Referring to FIG. 7(a), as a touch input of the finger or stylus pen is applied to the input region, the controller 180 may receive image information. At this time, the controller 180 may transmit the received information in real time to the counterpart.

As illustrated in the drawing, a message indicating that the received information is being transmitted to the counterpart in real time may be displayed in the input region. At this time, a send icon 255 is selected, the received information is not transmitted any more to the counterpart.

At this time, as illustrated in FIG. 7(b), a message indicating that the received information is not being transmitted to the counterpart in real time may be displayed in the input region. Meanwhile, though not shown in the drawing, when the send icon 255 is selected again, the received information can be transmitted to the counterpart again.

Referring to FIG. 8(a), as a touch input of the finger or stylus pen is applied to the input region, the controller 180 may receive image information. At this time, a send icon 254 may be displayed in the input region.

As illustrated in FIG. 8B, when the send icon 254 is selected, the controller 180 may transmit the received image information to the counterpart. At this time, a popup window 256 indicating that image information has been transmitted to the counterpart will be displayed.

Figure 9:
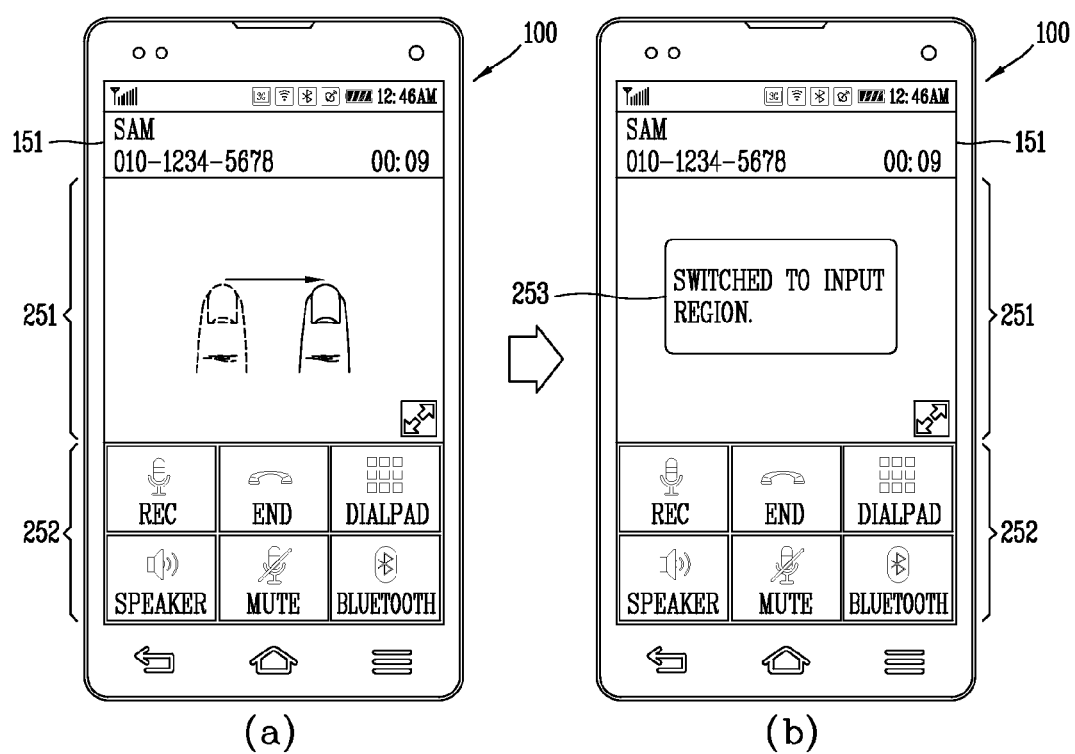
FIGS. 9 and 10 are conceptual views illustrating a user interface for determining a region to be switched to a region for receiving information on the active call screen.
Figure 10:
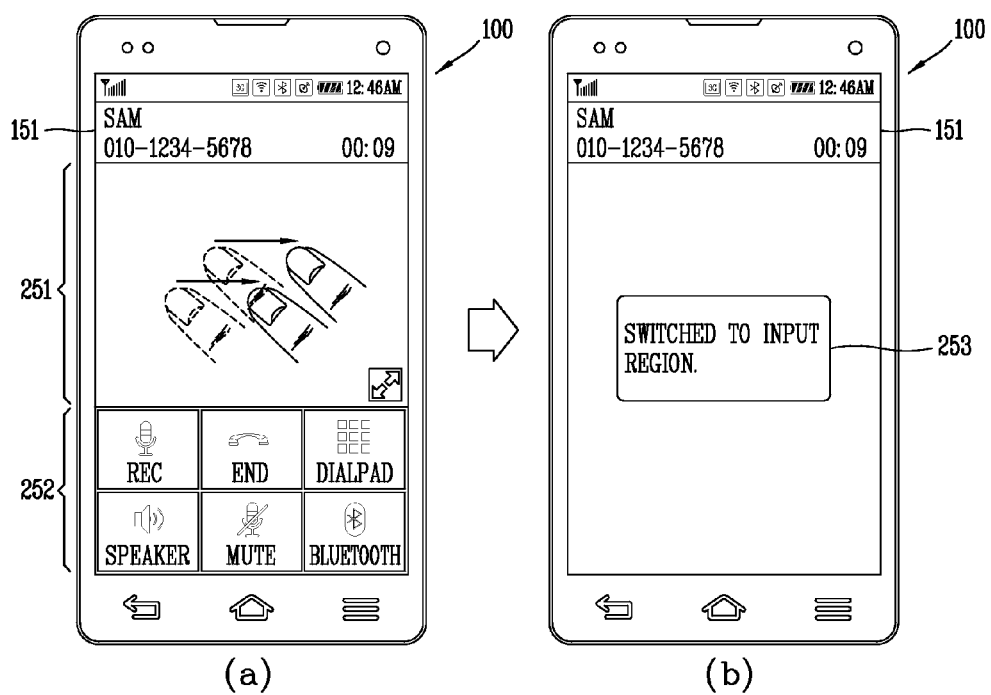

FIGS. 9 and 10 are conceptual views illustrating a user interface for determining a region to be switched to a region for receiving information on the active call screen. The mobile terminal 100 may include a display unit 151 and a controller 180 (refer to FIG. 1).

Referring to FIGS. 9(a) and (b), when a first touch input (for example, drag input) is applied to the active call screen, the controller 180 may switch the first region 251 to the input region. At this time, a popup window 253 indicating that the first region 251 has been switched to the input region will be displayed on the display unit 151 for a preset period of time.

On the other hand, referring to FIGS. 10(a) and (b), when a second touch input (for example, multi drag input) different from the first touch input is applied to the first region 251 of the active call screen, the controller 180 may switch both the first and the second region 251, 252 to the input region. Similarly, a popup window 253 indicating that the first and the second region 251, 252 have been switched to the input region will be displayed on the display unit 151 for a preset period of time.

On the other hand, though not shown in the drawing, a region to be switched to the input region from the active call screen may be determined based on the trace of a touch input applied to the display unit. Only a region in which the user's drag input is sensed on the active call screen may be switched to the input region.

Furthermore, though not shown in the drawing, when a touch input is applied to the first region 251 while an image received from the counterpart is displayed in the first region 251 during a video call, the controller 180 may display the input region to be overlapped with the first region 251 displayed with the image received from the counterpart. At this time, it may be possible to adjust the transparency of the first region 251 and input region.

Figure 11:
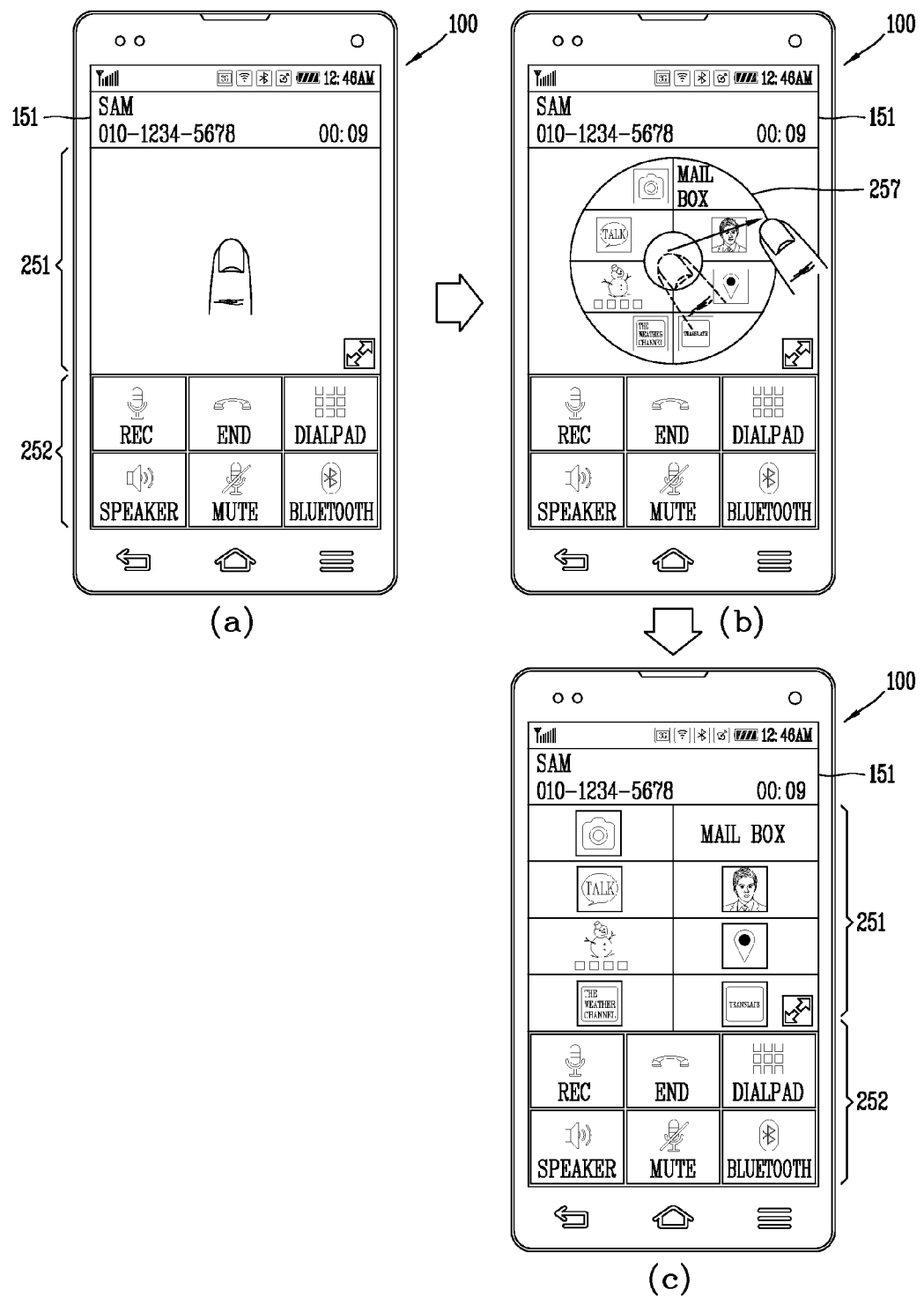
FIGS. 11 through 13 are conceptual views illustrating a user interface on which a menu screen containing an application execution menu is displayed in the switched region on the active call screen.
Figure 12:
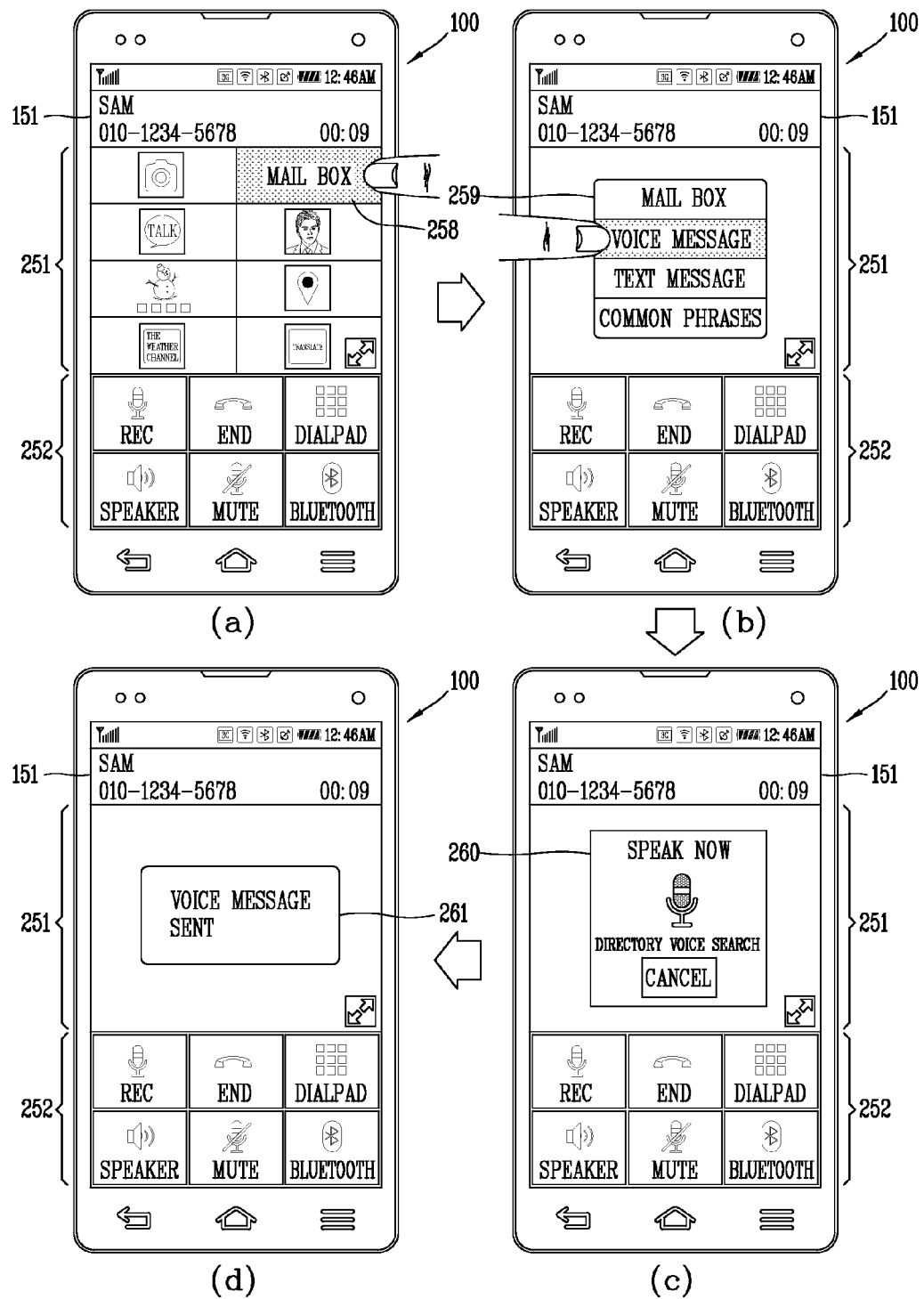
Figure 13:
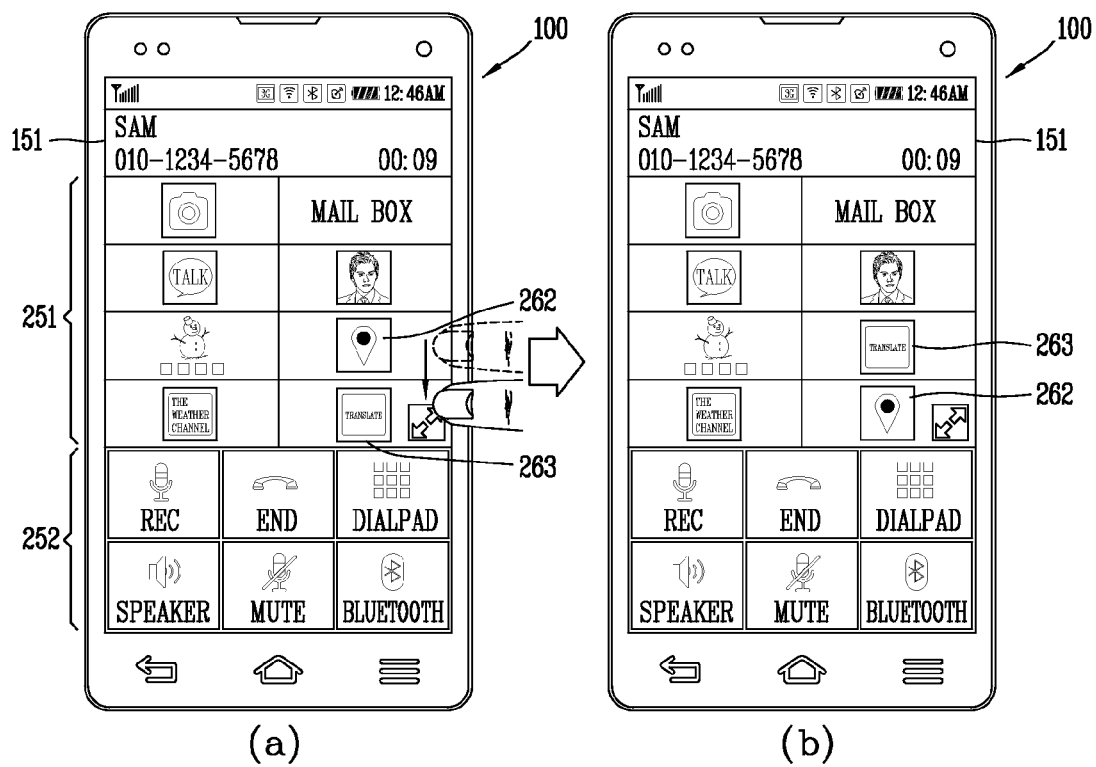

FIGS. 11 through 13 are conceptual views illustrating a user interface on which a menu screen containing an application execution menu is displayed in the switched region on the active call screen. The mobile terminal 100 may include a display unit 151 and a controller 180 (refer to FIG. 1).

Referring to FIG. 11(a), an active call screen may be displayed on the display unit 151. When a touch input is applied to the first region 251 of the active call screen, and a drag input consecutive to the touch input is applied, at least part 257 of the menu screen containing an application execution menu may be displayed in the first region 251 as illustrated in FIG. 11(b). At this time, when the user terminates the drag input, at least part 257 of the menu screen currently displayed in the first region 251 may be displayed as it is for a preset period of time. Here, the menu screen may be configured by the user, or previously configured within the terminal.

On the other hand, when the user continuously applies the drag input, the controller 180 may display the menu screen in the first region 251 as a whole. As illustrated in the drawing, the menu screen may include at least one of a plurality of icons, widgets, thumbnail images and application execution menus. Here, the thumbnail image may include at least one of a thumbnail image of the image file and a thumbnail image of the background screen.

On the other hand, though it is illustrated in the drawing that a menu screen is displayed in the first region 251 after applying a touch input to the first region 251, a menu screen may be displayed in the input region after applying a touch input to the input region switched from the first region 251.

Referring to FIGS. 12(a) and (b), when any one of the application execution menus (for example, "mail box application" 258) contained in a menu screen is selected, the controller 180 may execute the mail box application. To this end, a popup window 259 for selecting whether or not to execute any function of the mail box application may be displayed.

When any one a plurality of functions of the mail box application (for example, "voice message send function") is selected, a mail box application may be executed on the first region 251 as illustrated in FIG. 12(c). At the same time, a popup window 260 indicating that the mail box application is being executed may be displayed in the first region 251.

Then, referring to FIG. 12(d), the controller 180 may transmit the execution result of the mail box application to the counterpart to whom a call is being made. Furthermore, as illustrated in the drawing, a popup window 261 indicating that a voice message has been transmitted may be displayed in the first region 251 for a preset period of time. Meanwhile, the voice data may be converted into text data, and the converted text data may be transmitted to the counterpart to whom a call is being made according to the user's setting.

On the other hand, though it is illustrated in the drawing that a mail box application is executed on the first region 251, the mail box application may be executed on the input region switched from the first region 251.

Referring to FIGS. 13(a) and (b), when an edit mode for the menu screen is executed, the controller 180 may edit at least one application execution menu on the menu screen.

Specifically, when any one of the plurality of application execution menus contained in the menu screen (for example, "map application" execution menu 262) is dragged in the direction of the other one (for example, "translation application" execution menu 263), the arrangement order of the map application execution menu 262 and the translation application execution menu 263 may be changed.

On the other hand, though not shown in the drawing, the user can share the menu screen with the counterpart to whom a call is being made. Accordingly, when the user executes an application on the menu screen, the execution result may be transmitted to the counterpart to whom a call is being made. Similarly, when the user edits the menu screen, the edited result may be transmitted to the counterpart to whom a call is being made, and the edited result may be reflected on the menu screen displayed on the display unit of the counterpart's terminal.

Furthermore, though not shown in the drawing, the controller 180 may store information transmitted to the counterpart to whom a call is being made by the user along with a call log item for the counterpart. In other words, when a call log list containing a plurality of call log items is displayed on the display unit 151, the controller 180 may display at least part of the information that has been transmitted to the counterpart along with the call log item for the counterpart.

Furthermore, when a call log item for the counterpart is selected from the call log list, the controller 180 may allow the call log list to disappear from the display unit 151, and display information transmitted to the counterpart along with the call log item for the counterpart.

Figure 14:
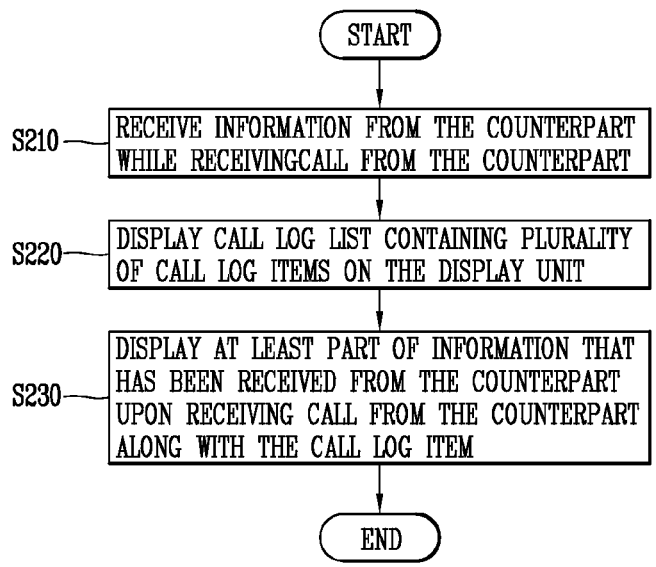
FIG. 14 is a flow chart for explaining a mobile terminal according to another embodiment of the present disclosure.

FIG. 14 is a flow chart for explaining a mobile terminal 100 (refer to FIG. 1) according to another embodiment of the present disclosure. The mobile terminal 100 may include a wireless communication unit 110 (refer to FIG. 1), a display unit display unit 151 (refer to FIG. 1), and a controller 180 (refer to FIG. 1).

Referring to FIG. 14, first, the process (S210) of receiving information from the counterpart when receiving a call from the counterpart is carried out.

When a call is received from the counterpart, a screen (or a graphic user interface, GUI) associated with the call (for example, active call screen) may be displayed on the display unit 151. Further, the display unit 151 is a touch sensitive display unit.

When the user receives a call from the counterpart, a screen associated with a call (for example, active call screen) may be displayed on the display unit 151. Upon receiving information from the counterpart while making a call to the counterpart, the controller 180 may switch at least a partial region of the screen to a region for displaying the received information. The received information may be stored in the memory 160 (refer to FIG. 1).

Next, the process (S220) of displaying a call log list containing a plurality of call log items on the display unit 151 and the process (S230) of displaying at least part of the information that has been received from the counterpart upon receiving a call from the counterpart along with a call log item for the counterpart are carried out.

The display unit 151 may display a call log list containing a plurality of call log items. The controller 180 may display at least part of the information that has been received from the counterpart along with a call log item for the counterpart when displaying the call log list.

For example, the controller 180 may display an icon corresponding to the kind of information that has been received from the counterpart along with the call log item for the counterpart. At this time, when the icon is selected, information that has been received from the counterpart may be displayed on the popup window or displayed on the entire screen.

On the other hand, when a call log item for the counterpart is selected from the call log list, the controller 180 may allow the call log list to disappear from the display unit 151, and display information received from the counterpart along with the call log item for the counterpart.

Furthermore, when a preset touch input is applied to the call log item for the counterpart, the controller 180 may display at least part of the call log information in a region displayed with the call log item for the counterpart while displaying the call log list as it is.

Figure 15:
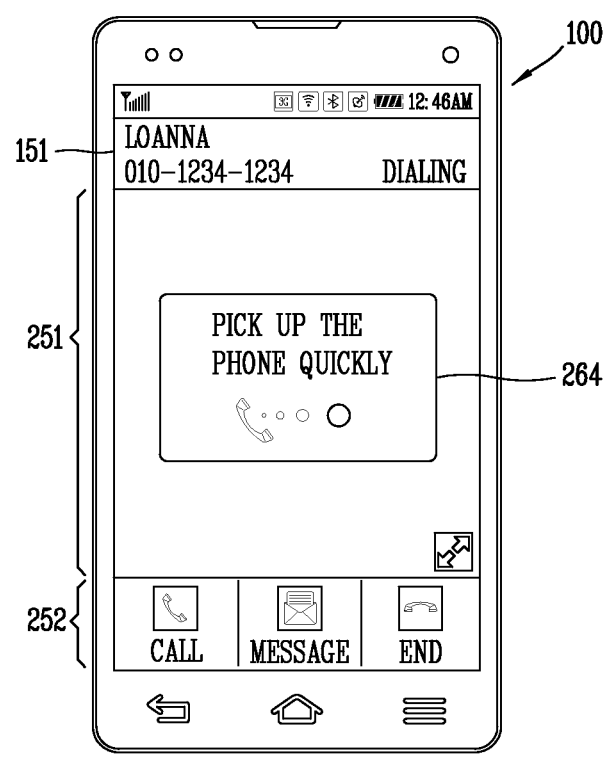
FIGS. 15 and 16 are conceptual views illustrating a user interface for receiving information from the counterpart.
Figure 16:
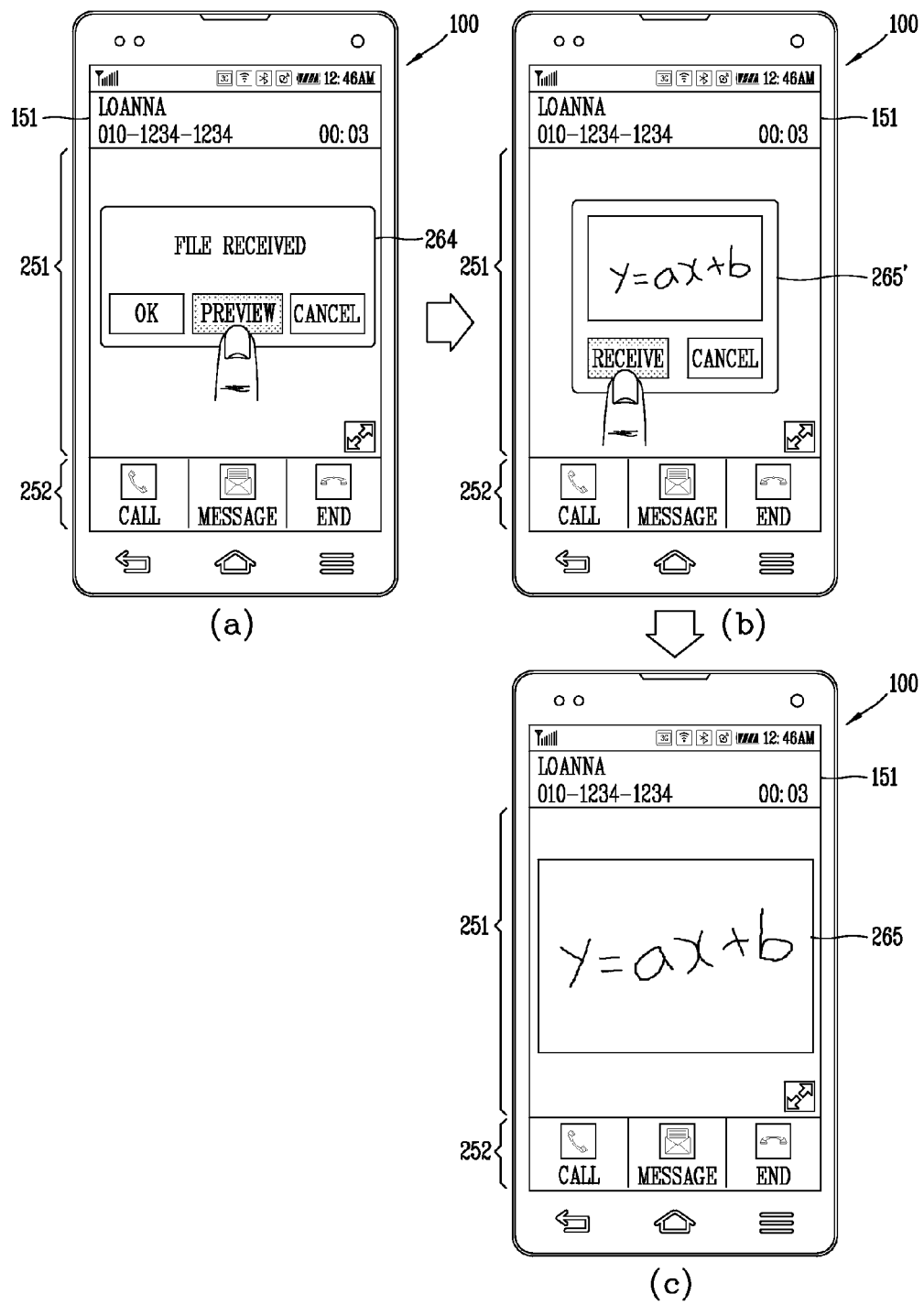

FIGS. 15 and 16 are conceptual views illustrating a user interface for receiving information from the counterpart. The mobile terminal 100 may include a wireless communication unit 110 (refer to FIG. 1), a display unit 151 (refer to FIG. 1), and a controller 180 (refer to FIG. 1).

Referring to FIG. 15, an incoming call screen may be displayed on the display unit 151 prior to connecting a call requested by the counterpart. The incoming call screen may be divided into a first region 251 for displaying the counterpart's thumbnail image (a call thumbnail image when the counterpart's thumbnail image is not stored therein) and a second region 252 for displaying icons associated with a call function. As illustrated in the drawing, information entered by the counterpart on the call standby screen may be displayed in the first region 251.

For example, the controller 180 may receive text data transmitted by the counterpart in a call standby state prior to connecting a call. As illustrated in the drawing, the controller 180 may display the received text data 264 in the first region 251 of the display unit 151. Then, the received text data 264 may be displayed along with the call log item in the call log list. It will be described later with reference to FIG. 19.

On the other hand, when the user is making a call to the counterpart, video data received from the counterpart may be displayed in real time.

Referring to FIG. 16(*a*), the display unit 151 may display a screen associated with a call to the counterpart when receiving a call from the counterpart, for example, an active call screen. The active call screen may be divided into a first region 251 for displaying the counterpart's thumbnail image and a second region 252 for displaying icons associated with a call function. As illustrated in the drawing, when the counterpart's thumbnail image is not stored therein, nothing may be displayed in the first region 251. Meanwhile, while the user is making a video call to the counterpart, an image received from the counterpart may be displayed in the first region 251.

When the counterpart to whom a call is being made transmits information (for example, an image file), the display unit 151 may display a popup window 264 for selecting whether or not to receive the image file in the first region 251.

At this time, when the user immediately selects to receive the image file, though not shown in the drawing, the controller 180 may receive the image file. At the same time, the controller 180 may switch the first region 251 to a region for displaying the received image file to display the received image file in the switched region.

On the other hand, when the user selects to check a preview screen of the image file, as illustrated in FIG. 16(*b*), the controller 180 may display a preview screen 265' of the image file on the first region 251. Then, when the user selects to receive the image file, the controller 180 can receive the image file as illustrated in FIG. 16(*c*). At the same time, the controller 180 may display the received image file.

Though an embodiment for receiving a file in the active call screen is illustrated in the drawing, the foregoing embodiment may be also applicable to the caller's call standby screen and the receiver's incoming call screen.

Figure 17:
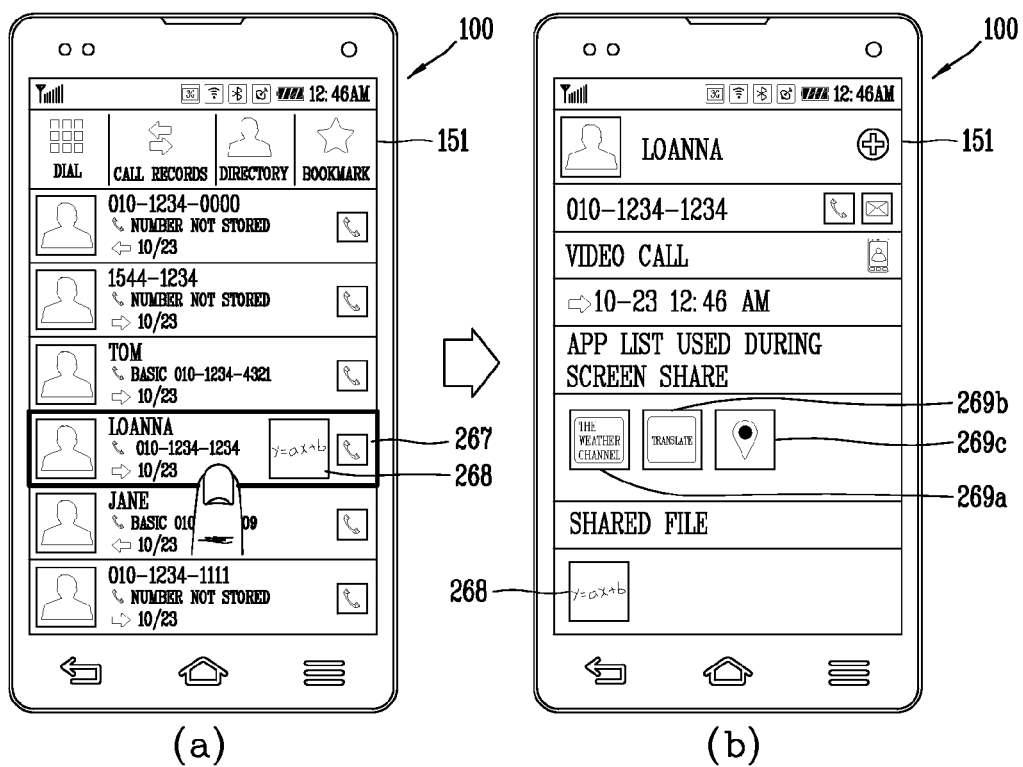
Figure 19:
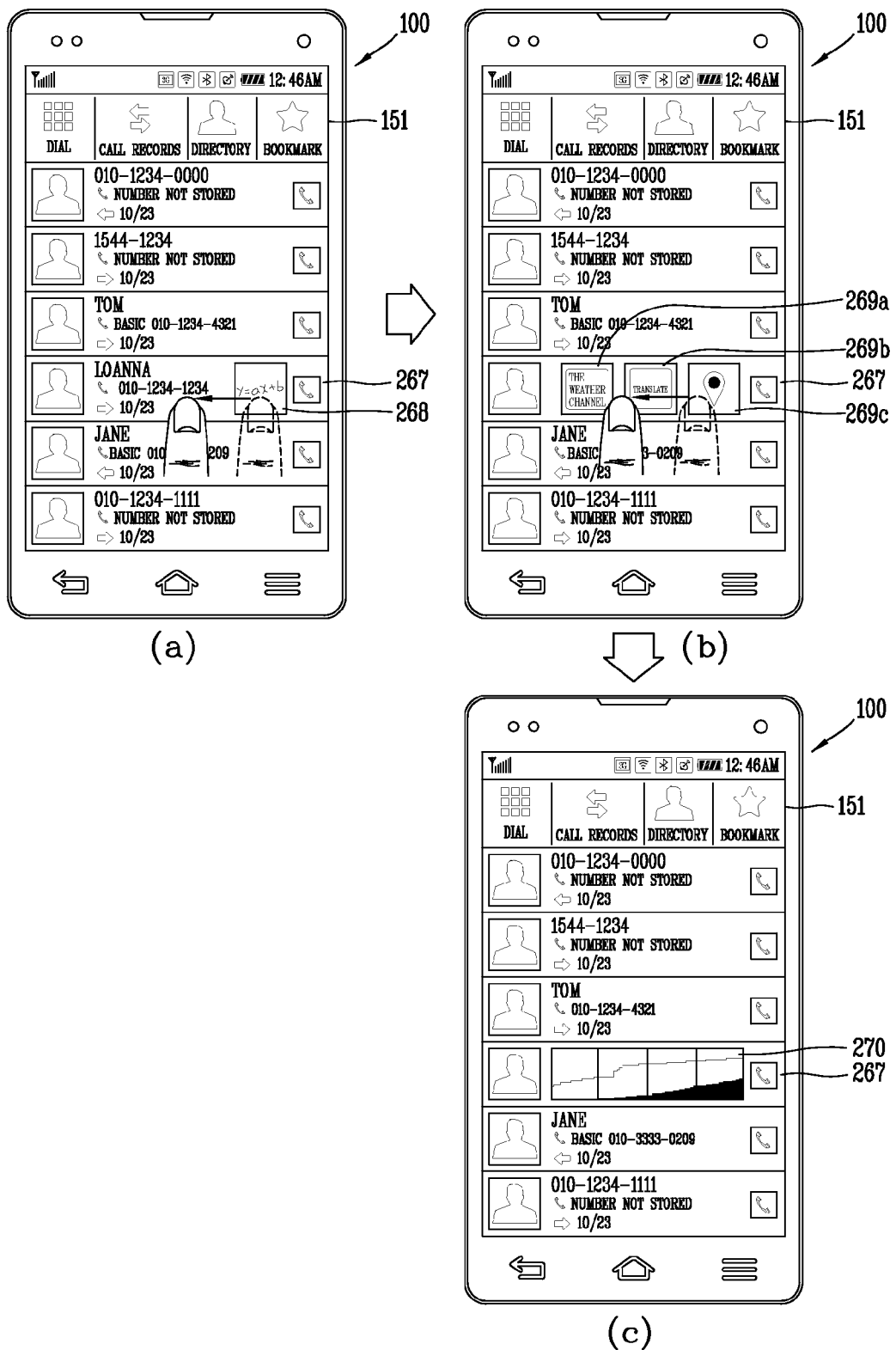

FIGS. 17 through 19 are conceptual views illustrating a user interface on which a call log list containing call log items is displayed. The mobile terminal 100 may include a wireless communication unit 110 (refer to FIG. 1), a display unit 151 (refer to FIG. 1), and a controller 180 (refer to FIG. 1).

Referring to FIGS. 17A and 18A, the display unit 151 may display a call log list containing a plurality of call log items. As illustrated in the drawing, the controller 180 may display at least part 268 of information that has been received from the counterpart (for example, "Loanna") along with the call log item 267 for Loanna. Accordingly, a thumbnail image 268 of the image file received from Loanna when making a call to Loanna may be displayed along with the call log item 267.

On the other hand, though not shown in the drawing, the controller 180 may display the counterpart who has transmitted information while making a call as a separate icon on the call log list.

Then, when the call log item 267 for Loanna is selected, the controller 180 may allow the call log list to disappear from the display unit 151, and display information received from Loanna along with call log information for Loanna as illustrated in FIG. 17(*b*).

Accordingly, applications 269*a*-269*c* executed by Loanna while making a call to Loanna may be displayed on the display unit 151. Furthermore, an image file 268 received from Loanna may be displayed on the display unit 151.

Though an embodiment for displaying applications 269*a*-269*c* executed by Loanna while making a call to Loanna is illustrated in the drawing, applications executed by Loanna prior to connecting a call requested by Loanna may be displayed as call log information.

On the other hand, though not shown in the drawing, when any one of applications 269*a*-269*c* is selected, the controller 180 may execute a function associated with the selected application. For example, when the selected application is installed in the memory 160 (refer to FIG. 1), the controller 180 may execute the selected application. On the contrary, when the selected application is not installed in the memory 160, the controller 180 may access a server for downloading the selected application.

Furthermore, when any one of the applications 269a-269c and image file 268 displayed on the display unit 151 is selected, information associated with the selected application or the selected file may be displayed on the display unit 151. For example, time information at which the selected file is downloaded, the capacity information of the selected file and the like may be displayed on the display unit 151.

On the other hand, when the call log item 267 for Loanna is selected, the controller 180 may allow the call log list to disappear from the display unit 151, and display information that has been received from Loanna for a preset period of time along with call log information for Loanna for a preset period of time.

For example, the controller 180 may display an image file or the like received from Loanna through a memo application while making a call for a preset period of time. Though not shown in the drawing, when the displayed filed is selected, the execution screen of an application associated with the selected image file may be displayed.

As illustrated in FIG. 18(b), when a plurality of image files are received from Loanna, a thumbnail image 268' for the most recently received image file may be used as a thumbnail image 269 showing a preview screen of the call log item 267 illustrated in FIG. 18(a). If a new image file is received from Loanna, then the controller 180 will display a thumbnail image for the newly received image file as a thumbnail image showing the preview screen of the call log item 267.

Furthermore, as illustrated in the drawing, icons showing the storage paths of the plurality of received image files received from Loanna may be displayed on a plurality of image files, respectively. For example, an icon 268a indicating that the received image file has been stored in an electronic note application and an icon 268b indicating that the received image file has been stored in a photo album application may be displayed along with the received image files, respectively.

As illustrated in FIG. 18(c), the call log information and received information for Loanna for a preset period of time may be scrolled based on a touch input (for example, flick input) to the display unit 151. The call log information and received information for Loanna for a preset period of time may be displayed on the display unit 151 as many as a preset number thereof in various orders (for example, recently received, etc.).

Though not shown in the drawing, at least part of the call log information may be deleted based on the user's selection or the controller's selection. Even when the call log information is deleted in this manner, image files that have been received from the counterpart in connection with the call log information may not be deleted.

On the other hand, an image file received from the counterpart may be deleted based on the user's selection or the controller's selection. When the image file received from the counterpart is deleted in this manner, log information with image files received from the counterpart may be deleted at the same time. If an image file used as a thumbnail image showing the preview screen of the call log item 267 is deleted, then the preview screen of the call log item 267 will be changed to a thumbnail image of another image file.

Referring to FIG. 19(a), a call log list containing a plurality of call log items may be displayed on the display unit 151. At this time, when a preset touch input is applied to the call log item 267 for Loanna, the controller 180 may display at least part of the call log information in a region displayed with the call log item 267 for Loanna while displaying the call log list as it is.

Specifically, referring to FIG. 19(b), the controller 180 may display applications 269a-269c executed by Loanna in a region displayed with the call log item 267 for Loanna. Though not shown in the drawing, when any one of the applications is selected, the controller 180 may execute a function associated with the selected application.

Then, when a preset touch input is applied to the call log item 267 for Loanna, the controller 180 may display another part of the call log information in a region displayed with the call log item 267 for Loanna.

Specifically, referring to FIG. 19(c), the controller 180 may display data used amount information while performing a call to Loanna in a region displayed with the call log item 267 for Loanna. Here, the data used amount information may be displayed in the form of a graph, a progress bar, or a numeral, and the data used amount information for video call and voice call, respectively, may be displayed with different colors.

On the other hand, a message transmitted by Loanna may be displayed in the call log item when a call received from Loanna is not accepted. Furthermore, an image captured when performing a video call to Loanna may be displayed. In addition, text data corresponding to voice data for a specific period of time from the content of a phone call to Loanna while performing a call to Loanna may be displayed.

Figure 20:
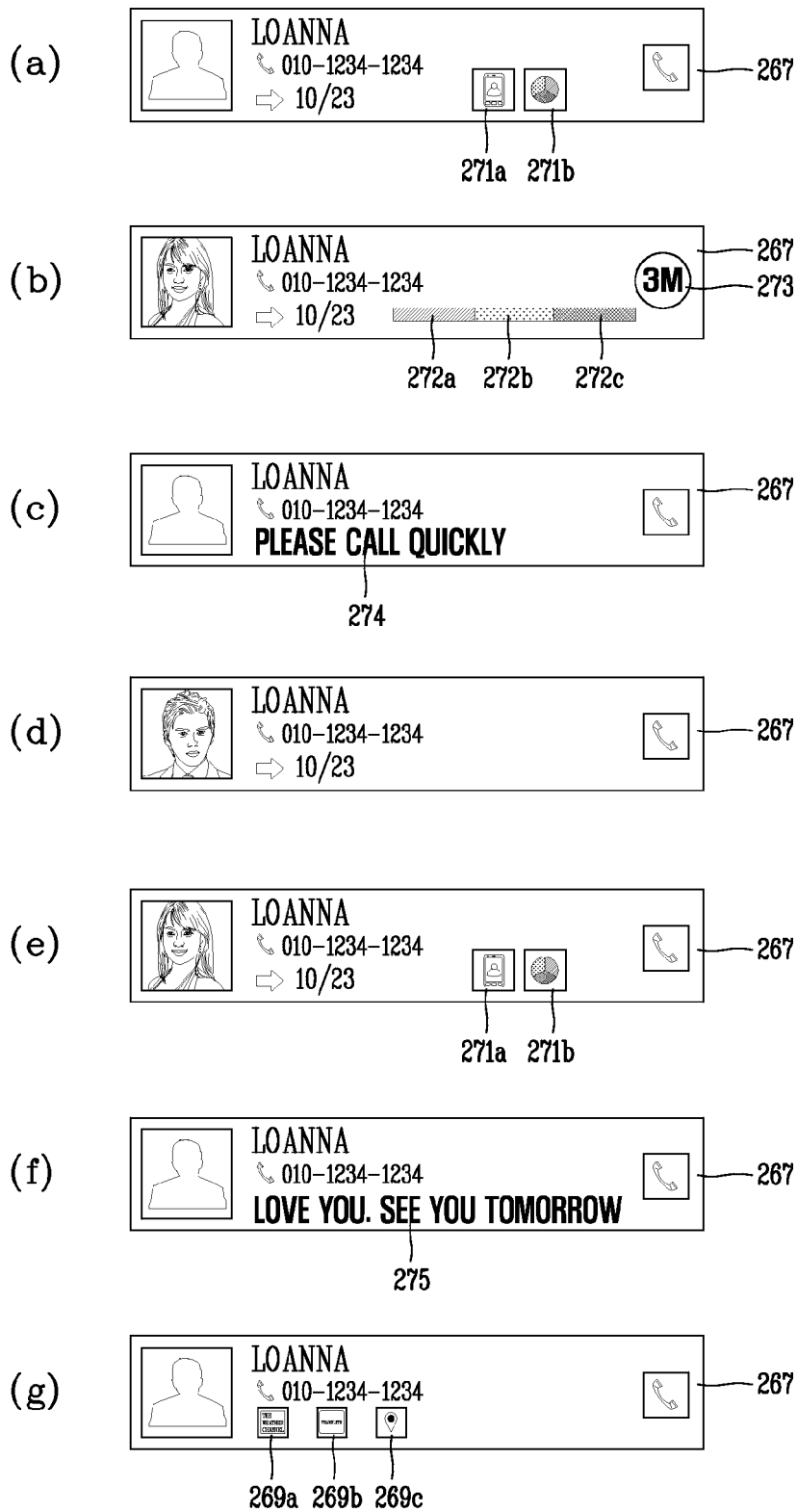

FIG. 20 is a view illustrating the display form of a call log item (for example, call log item to Loanna) 267 contained in the call log list in FIGS. 17 through 19.

Specifically, referring to FIG. 20(a), information associated with a call to Loanna may be displayed on the call log item 267 for Loanna. The call related information may include which one of the video call and voice call to Loanna has been made, data used amount information while performing a call to Loanna, and the like. For example, as illustrated in the drawing, an icon 271a indicating that the video call has been carried out and an icon 271b with a pie chart indicating a data use ratio for a plurality of communication networks (3G, 4G, VoLTE, etc.), respectively.

Referring to FIG. 20(b), call type information while performing a call to Loanna may be displayed on the call log item 267 for Loanna. Such an embodiment may be applicable because the call type can be changed while continuing to maintain a call to the counterpart in a voice over LTE (VoLTE) environment.

For example, as illustrated in the drawing, an icon 272a, 272b, 272c with a bar graph indicating the use ratio of a plurality of call types (voice call 272a, video call 272b, screen share call 272c, etc.), respectively, while making a call to Loanna and an icon 273 indicating a total call time may be displayed along with the call log item 267.

On the other hand, the controller 180 may display colors corresponding to a plurality of communication networks, respectively, in a different manner in the bar graph. Accordingly, the user can intuitively check the use ratio of a plurality of call types, respectively, while making a call to Loanna. Though not shown in the drawing, used amount information for a plurality of call types, respectively, may be displayed with numerals along with the bar graph. The description thereof may be applied to a pie chart illustrated in FIG. 19(a).

On the other hand, the controller 180 may change the color of an icon 273 indicating a total data used amount based on the level of the total data used amount. For example, though not shown in the drawing, when the total data used amount exceeds a preset amount, the controller 180 may display the icon 273 in a dark color, thereby issuing a warning about the data used amount.

Referring to FIG. 20(*c*), a text message 274 received from Loanna when making a call to Loanna may be displayed at the same time on the call log item 267 for Loanna. The text message 274 may be stored in the memory 160 (refer to FIG. 1).

Referring to FIG. 20(*d*), a file received from Loanna when performing a call to Loanna may be displayed on the call log item 267 for Loanna. As illustrated in the drawing, an image file received from Loanna may be displayed in substitute for the image of Loanna.

Referring to FIG. 20(*e*), while performing a video call to Loanna, the controller 180 may capture a scene of video received from Loanna or capture a scene displayed at a preset time.

Referring to FIG. 20(*f*), while performing a call to Loanna, the controller 180 may convert several words of voice received from Loanna into text data to display them on the call log item 267 for Loanna. While the user performs a call to Loanna, the controller 180 may convert several words of voice selected by the user to text data or convert a voice received at a preset time into text data.

Referring to FIG. 20(*g*), the controller 180 may display applications 269*a*-269*c* executed by Loanna or application shared by Loanna on the call log item 267 for Loanna. Though it is illustrated in the drawing that icons corresponding to applications 269*a*-269*c* are displayed, the names of the applications 269*a*-269*c* may be displayed in the form of text data. Furthermore, when the user selects at least one of the icons corresponding to applications 269*a*-269*c*, an application corresponding to the selected icon may be executed.

According to an embodiment of present disclosure, the foregoing method may be implemented as codes readable by a processor on a medium written by a program. Examples of the processor-readable media may include ROM, RAM, CD-ROM, magnetic tape, floppy disk, and optical data storage device, and the like, and also include a device implemented in the form of a carrier wave (for example, transmission via the Internet).

The configurations and methods according to the above-described embodiments will not be applicable in a limited way to the foregoing mobile terminal, and all or part of each embodiment may be selectively combined and configured to make various modifications thereto.

What is claimed is:

1. A mobile terminal, comprising:
a wireless communication unit configured to perform a call function with at least one counterpart terminal;
a touchscreen configured to display a call screen indicating the call function to the counterpart terminal is being performed, wherein the call screen includes a first region including contact information about the counterpart terminal and a second region including icons associated with the call function; and
a controller configured to:
receive a touch input on the first region while the call function is being performed,
switch at least the first region of the call screen to an input region for inputting information in response to the touch input on the first region, and
transmit the input information to the counterpart terminal.

2. The mobile terminal of claim 1, wherein the controller is further configured to transmit the input information to the counterpart terminal in real time.

3. The mobile terminal of claim 1, wherein the controller is further configured to:
display a send icon in the switched region for transmitting the input information to the counterpart terminal, and
transmit the input information to the counterpart terminal in response to a selection of the send icon.

4. The mobile terminal of claim 1, wherein the controller is further configured to display a menu screen containing at least one application execution menu in the switched region in response to a touch input applied to the switched region.

5. The mobile terminal of claim 4, wherein the controller is further configured to:
receive a selection of a first application execution menu in the menu screen,
execute the selected first application, and
transmit an execution result of the first application to the counterpart terminal.

6. The mobile terminal of claim 4, wherein the controller is further configured to edit the at least one application execution menu on the menu screen in response to predetermined touch inputs on the menu screen.

7. The mobile terminal of claim 1, wherein the controller is further configured to store the information transmitted to the counterpart terminal along with call log information for the counterpart terminal in a memory associated with the mobile terminal.

8. The mobile terminal of claim 7, wherein the controller is further configured to:
display a call log list on the touchscreen containing a plurality of call log items, and
display at least part of the information that has been transmitted to the counterpart terminal along with a call log item for the counterpart terminal.

9. The mobile terminal of claim 8, wherein the controller is further configured to:
stop displaying the call log list on the touchscreen in response to the call log item for the counterpart terminal being selected from the call log list, and
display the information transmitted to the counterpart terminal along with call log information of the call log item for the counterpart terminal.

10. The mobile terminal of claim 1, wherein the controller is further configured to:
convert input voice data to text data while the switched region is displayed, and
transmit the text data as the input information to the counterpart terminal.

11. A mobile terminal, comprising:
a wireless communication unit configured to receive an incoming call function from at least one counterpart terminal;
a touchscreen configured to display an incoming call screen indicating the incoming call function from the counterpart terminal is being received, wherein the incoming call screen includes a first region including contact information about the counterpart terminal and a second region including icons associated with the incoming call function; and
a controller configured to:
receive a file from the counterpart terminal while receiving the incoming call function,
display information indicating the file is being received from the counterpart terminal in the first region,
display contents of the file in the first region in response to an acceptance to receive the file from the counterpart terminal, and display a call log list on the touchscreen including a plurality of call log items including a call log item for the incoming call function received from the counterpart terminal, wherein the call log item for the incoming call function includes call information about the incoming call function and a graphic object indicating the file received from the counterpart terminal.

12. The mobile terminal of claim 11, wherein the graphic object corresponds to an icon indicating a type of the file received from the counterpart terminal.

13. The mobile terminal of claim 12, wherein the controller is further configured to:
receive a selection of the call log item for the incoming call function,
stop displaying the call log list on the touchscreen in response to the selection of the call log item, and
display detailed call log information included in the call log item.

14. The mobile terminal of claim 13, wherein the detailed call log information contains application information that has been executed by the counterpart terminal while performing the incoming call function.

15. The mobile terminal of claim 13, wherein the controller is further configured to:
receive a touch input in a preset direction applied to the call log item, and
display at least part of the detailed call log information in a region displayed with the call log item while continuing to display other call log items unchanged in the call log list.

16. The mobile terminal of claim 15, wherein the controller is further configured to horizontally scroll through the detailed call log information while continuing to display the other call log items unchanged in the call log list in response to a scrolling touch input.

17. The mobile terminal of claim 11, wherein the controller is further configured to:
display a preview screen of the file received from the counterpart terminal on the touchscreen, and
receive the contents of the file from the counterpart terminal in response to an input icon being selected.

18. A control method of a mobile terminal, the method comprising:
performing a call function, via a wireless communication unit of the mobile terminal, with at least one counterpart terminal;
displaying, via a touchscreen of the mobile terminal, a call screen indicating the call function to the counterpart terminal is being performed, wherein the call screen includes a first region including contact information about the counterpart terminal and a second region including icons associated with the call function;
receiving, via a controller of the mobile terminal, a touch input on the first region while the call function is being performed;
switching, via the controller, at least the first region of the call screen to an input region for inputting information in response to the touch input on the first region; and
transmitting, via the wireless communication unit, the input information to the counterpart terminal.

19. A control method of a mobile terminal, the method comprising:
receiving, via a wireless communication unit of the mobile terminal, an incoming call function from at least one counterpart terminal;
displaying, via a touchscreen of the mobile terminal, an incoming call screen indicating the incoming call function from the counterpart terminal is being received, wherein the incoming call screen includes a first region including contact information about the counterpart terminal and a second region including icons associated with the incoming call function;
receiving, via the wireless communication unit, a file from the counterpart terminal while receiving the incoming call function;
displaying, via the touchscreen, information indicating the file is being received from the counterpart terminal in the first region;
displaying, via the touchscreen, contents of the file in the first region in response to an acceptance to receive the file from the counterpart terminal; and
displaying, via the touchscreen, a call log list including a plurality of call log items including a call log item for the incoming call function received from the counterpart terminal,
wherein the call log item for the incoming call function includes call information about the incoming call function and a graphic object indicating the file received from the counterpart terminal.

* * * * *